United States Patent
Khosla et al.

(12) 
(10) Patent No.: US 6,202,061 B1
(45) Date of Patent: Mar. 13, 2001

(54) METHODS AND APPARATUSES FOR CREATING A COLLECTION OF MEDIA

(75) Inventors: Aditya Khosla, Mountain View; James Lei, Cupertino; Shantanu Narayen, Sunnyvale; Steve Morris, Palo Alto; Wu Wang, Los Altos, all of CA (US)

(73) Assignee: Pictra, Inc., Sunnyvale, CA (US)

( * ) Notice: Subject to any disclaimer, the term of this patent is extended or adjusted under 35 U.S.C. 154(b) by 0 days.

(21) Appl. No.: 08/957,226

(22) Filed: Oct. 24, 1997

(51) Int. Cl.$^7$ .............................. G06F 17/30; G06F 3/00
(52) U.S. Cl. ..................... 707/3; 707/5; 707/104; 707/501; 345/350; 345/346
(58) Field of Search ..................... 707/3, 5, 10, 100, 707/103, 104, 501, 513, 514, 515; 345/302, 350, 356, 352, 346, 348, 349; 709/201

(56) References Cited

U.S. PATENT DOCUMENTS

| | | | |
|---|---|---|---|
| 5,659,742 | * 8/1997 | Beattie et al. | 707/104 |
| 5,717,914 | * 2/1998 | Husick et al. | 707/5 |
| 5,761,666 | * 6/1998 | Sakai et al. | 707/100 |
| 5,764,972 | * 6/1998 | Crouse et al. | 707/1 |
| 5,832,499 | * 11/1998 | Gustman | 707/103 |

OTHER PUBLICATIONS

Smith et al., Enhancing image search engines in visual information enviornments, IEEE Multimedia Signal Processing, pp. 545–552, Jun. 25, 1997.*

CAMRAX, Camrax inc, www.camrax.com, Knoware image databases, software, May 1996.*

FotoFlood, Epicad inc, www.epicad.com, software product, pp. 1–3, Dec. 1995.*

Graphic workshop for Dos, www.mindworkshop.com, pp. 1–3, Nov. 1996.*

Photo fun for newbies, Photosuite 8.0, CNET reviews, www.cnet.com, pp. 1–2, Oct. 1996.*

Photoshop for dummies, Adobe Photodeluxe, CNET reviews, www.cnet.com, pp. 1–3, Aug. 1996.*

Photovista, CNET reviews, www.cnet.com, pp. 1–3, Jul. 1997.*

* cited by examiner

Primary Examiner—Hosain T. Alam
Assistant Examiner—Sanjiv Shah
(74) Attorney, Agent, or Firm—Blakely, Sokoloff, Taylor & Zafman

(57) ABSTRACT

Methods and systems for creating a collection of digital media. In one example of a method, at least one search parameter is defined, and a search is performed using the search parameter to search through parameters for a first plurality of digital media. The search obtains a second plurality of digital media which is a subset of the first plurality of digital media. Then a media container is automatically generated from the search results. The media container may, in one embodiment, be a digital picture album having multiple pages with multiple digital pictures.

16 Claims, 24 Drawing Sheets

METHODS AND APPARATUSES FOR CREATING A COLLECTION OF MEDIA

FIELD OF THE INVENTION

The present invention relates to methods and apparatuses for creating a collection of digital media in a digital processing system.

BACKGROUND OF THE INVENTION

The creation and editing of electronic documents on digital processing systems, such as computer systems, has allowed users of such systems to create elaborate and creative documents. One obstacle to the use of such systems is the interface between the user and the computer system. This interface, often referred to as a user interface, is sometimes so difficult to understand and/or to use that only relatively trivial electronic documents can be created and edited by a typical user.

Graphical user interfaces are typically easier to use than command line user interfaces. As a result, graphical user interfaces have proliferated on computer systems. Such interfaces provide different types of views to the user. For example, one view which is commonly available from document processing software is a "page view" which typically shows a full view of a complete page of a document. This view is different from what may be considered to be a magnified view showing only a portion of a page. Thus, if a page contains several objects, such as several different digital images on one page, the magnified view may only show one or two such images, whereas the page view would show all the images on the page.

Another conventional method used in graphical user interfaces involves miniaturized images which represent a page. These miniaturized images are often referred to as "thumbnails." An example of these thumbnails may be found in certain computer programs, such as ClarisWorks from Apple Computer, Inc. These thumbnail views of a page are presented to a user when the user desires to open an existing document to either view the document or edit the document. Typically, a dialog box is displayed to the user, and this dialog box includes a listing of available, existing documents which may be viewed using the program. By selecting one of the documents, a thumbnail image of the document may be made to appear in the dialog box. This allows the user to verify that the document is the document which the user desired to view. This is often useful in cases where the file name for the document does not tell the user the content of the file (e.g. because the user forgot the file name which was used to store the document). This thumbnail image is also often referred to as a preview image. That is, it allows the user to preview the image before actually opening the full page of the document.

Often, a page of a document will have multiple objects, such as digital images, on the page. Typically, these multiple objects are placed on the page through manual interaction between the user and the computer system. For example, the user may select several different objects and cause them to be placed on the page. While this is often desirable in many cases, it does not allow the user to automatically create a collection of documents which may be desirable in certain cases.

SUMMARY OF THE INVENTION

The present invention discloses methods and apparatuses for creating a collection of digital media in a digital processing system. A method in one example of the invention defines search parameters, such as at least one search parameter. Using the search parameter, the digital processing system searches through parameters for a first plurality of digital media to obtain a second plurality of digital media which may be a subset of the first plurality of digital media. Then the digital processing system generates automatically after the search a media container for the second plurality of digital media.

In one particular embodiment of the present invention, the digital media are digital pictures and the media container is a picture album. The computer user may select the search criteria and then have the computer system automatically search through a picture database to provide the digital pictures which match the search parameters. Then after confirming with the user that a new picture album is created, the digital processing system automatically generates from the search results a picture album containing the pictures which were found in the search.

Computer systems which employ the methods of the present invention are also described, as well as software stored on computer readable storage medium which allows the computer system to perform the present invention.

DETAILED DESCRIPTION

Figure 1:
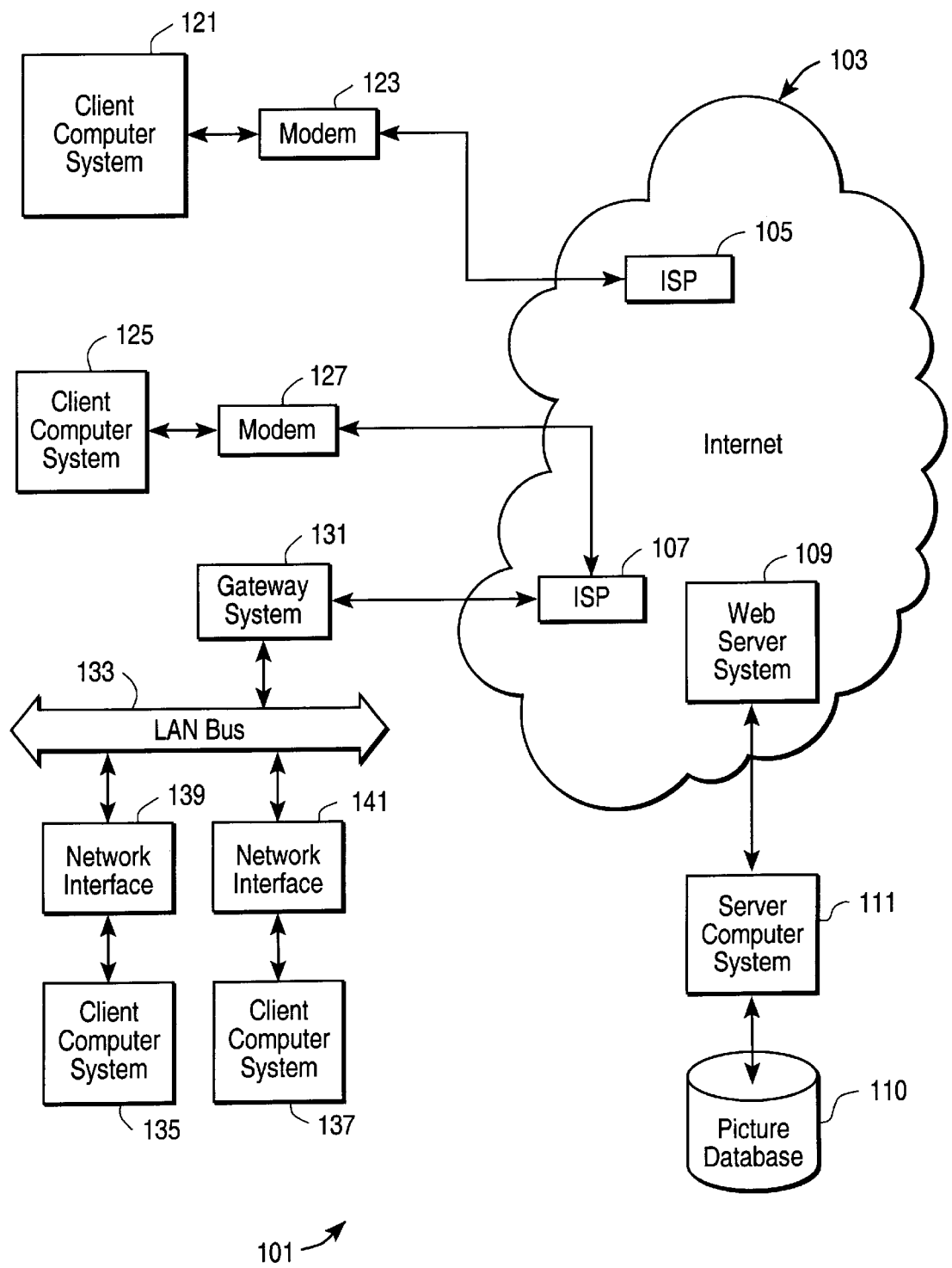
FIG. 1 shows an example of several client computer systems coupled to the Internet, and a server computer system with a picture database or a database of other digital media according to one embodiment of the present invention.

The subject invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail. In the drawings, the same element is labeled with the same reference numeral.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright© Pictra, Inc. 1997.

In order to provide the proper context for the present invention, the following description will first discuss a network of computer systems. The present invention typically is used on a client computer system which may be used in such a network. It will be appreciated, however, that the present invention may be used in a stand-alone computer system which is not coupled to a network. Other aspects of the present invention may, but are not required to, use functions provided by the network, such as a publishing operation.

FIG. 1 shows several computer systems which are coupled together through the Internet. It will be appreciated herein that the term "Internet" refers to a network of networks which uses certain protocols (e.g. the TCP/IP protocol, and possibly other protocols such as HTTP for HTML documents). The physical connections of the Internet and the protocols and communication procedures of the Internet are well known to those in the art. Access to the Internet 103 is typically provided by Internet service providers (ISP), such as ISPs 105 and 107. Users on client computer systems, such as client computer systems 121, 125, 135, and 137 obtain access to the Internet 103 through the Internet service providers, such as ISPs 105 and 107. Access to the Internet allows users of the client computer systems to exchange information, receive and send e-mails and view documents, such as documents which have been prepared in the hypertext markup language (HTML) format. These documents are often provided by web servers, such as web server 109 which is considered to be "on" the Internet. Often, these web servers are provided by the ISPs, such as ISP 105, although a computer system may be set up and connected to the Internet without that system being also an ISP as is known in the art. The web server system 109 is typically at least one computer system which operates as a server computer system and is configured to operate with the protocols of the World Wide Web and is coupled to the Internet. Optionally, the web server 109 may be part of an ISP which provides access to the Internet for client systems.

The web server 109 is shown coupled to the server computer system 111 which itself is coupled to a picture database 110. It will be appreciated that while two computer systems 109 and 111 are shown in FIG. 1, the web server system 109 and the server computer system 111 may be one computer system having different software components providing the web server functionality and the server functionality provided by server computer system 111, which will be described further below. Client computer systems 121, 125, 135, and 137 may each, with the appropriate web browsing software, view HTML pages provided by the web server 109. The ISP 105 provides Internet connectivity to the client computer system 121 through the modem interface 123 which may be considered part of the client computer system 121. The client computer system may be a "WINTEL" computer system, a network computer, a Web TV type system or other types of computer systems. Similarly, the ISP 107 provides Internet connectivity for client systems 125, 135, and 137, although as shown in FIG. 1, the connections are not the same for these three computer systems. Client computer system 125 is coupled through a modem interface 127 while client computer systems 135 and 137 are part of a local area network (LAN). While FIG. 1 shows the interfaces 123 and 127 as a "modem," it will be appreciated that each of these interfaces may be an analog modem, an ISDN modem, a cable modem, a satellite transmission interface (e.g. "Direct PC") or other interfaces for coupling a computer system to other computer systems. Client computer systems 135 and 137 are coupled to a LAN bus 133 through network interfaces 139 and 141, which may be Ethernet or other network interfaces. The LAN bus is also coupled to a gateway computer system 131 which may provide firewall and other Internet related services for the local area network. This gateway computer system 131 is coupled to the ISP 107 to provide Internet connectivity to the client computer systems 135 and 137. The gateway computer system to 131 may be a conventional server computer system. Also, the web server system 109 may be a conventional server computer system.

Figure 2:
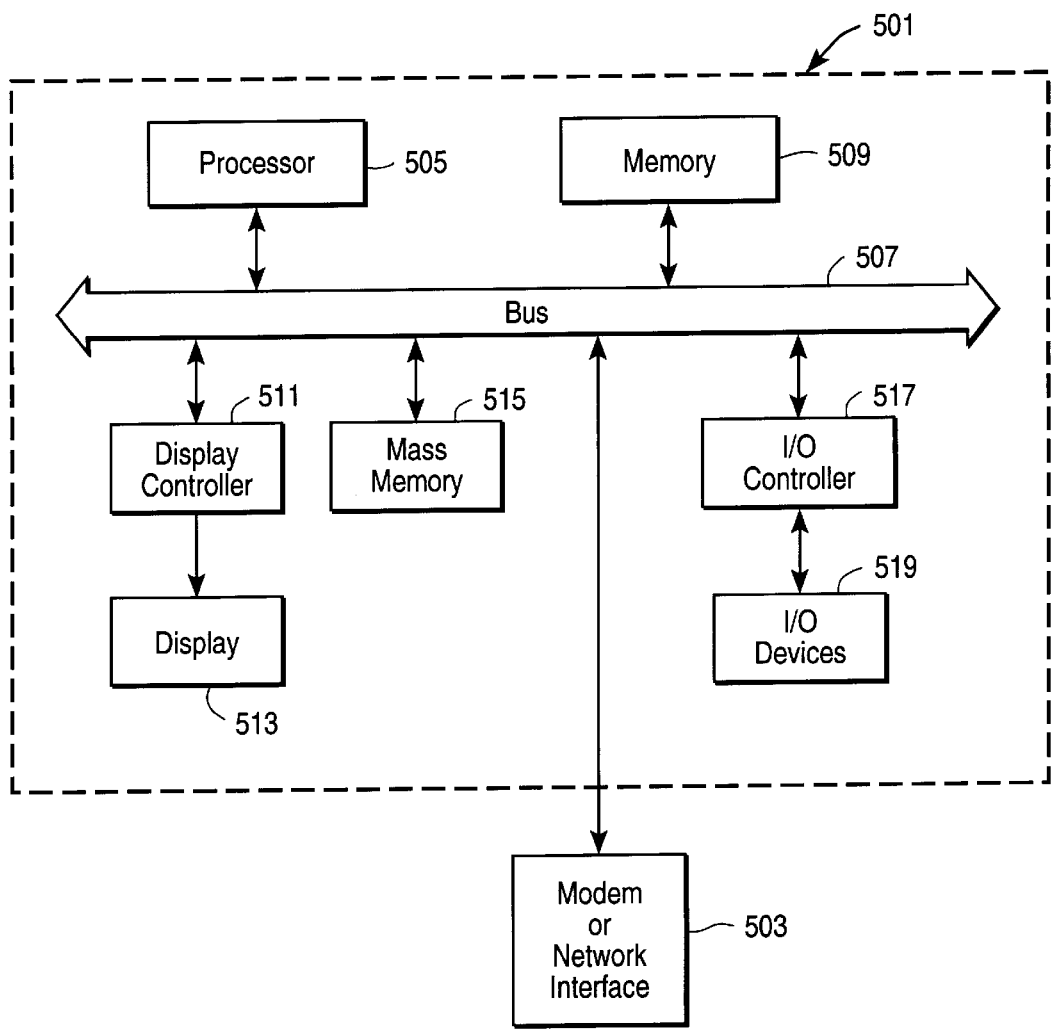
FIG. 2 shows an example of a computer system which may be used with the present invention.

FIG. 2 shows one example of a computer system which may be used as either a client computer system or a server computer system or as a gateway system or as a web server system. It will also be appreciated that such a computer system may be used to perform many of the functions of Internet service providers, such as ISP 105. The computer system 501 interfaces to external systems through the modem or network interface 503. It will be appreciated that the modem or network interface 503 may be considered to be part of the computer system 501. This interface 503 may be an analog modem, an ISDN modem, cable modem, token ring interface, satellite transmission interface (e.g. "Direct PC"), Ethernet interface, or other interfaces for coupling a computer system to other computer systems. The computer system 501 includes a processor 505 which may be a conventional microprocessor, such as an Intel Pentium microprocessor or Motorola Power PC microprocessor. Memory 509 is coupled to the processor 505 by a bus 507. Memory 509 may be dynamic random access memory (DRAM) and may also include static RAM (SRAM). The bus 507 couples the processor 505 to the memory 509 and also to mass memory 515 and to display controller 511 and the I/O (input/output) controller 517. The display controller 511 controls display on a display device, such as a CRT or a liquid crystal display, shown generically as display 513. The input/output devices 519 may include a keyboard, disk drives, printers, a digital camera, a scanner, and other input and output devices, including a mouse or other pointing device. Display controller 511 and the I/O controller 517 may be implemented with conventional well known technology. The mass memory 515 is often a magnetic hard disk, an optical disk, or another form of storage for large amounts of data which are often written, by a DMA process, into memory 509 during execution of software in the computer system 501. It will be appreciated that the computer system 501 is one example of many possible computer systems which have different architectures. For example, WINTEL systems (systems which run a Microsoft Windows operating system on an Intel microprocessor) often have multiple busses, one of which may be considered a peripheral bus. Network Computers may also be considered to be a computer system which may be used with the present invention. Network computers may not include a hard disk or other mass storage, and executable programs are loaded from a network into memory 509 for execution by the processor 505. A Web TV system, which are known in the art, may also be considered to be a computer system according to the present invention, but it may not include certain features shown in FIG. 2, such as certain input or output devices. A typical computer system will usually include at least a processor, memory, and a bus coupling the memory to the processor.

Figure 3:
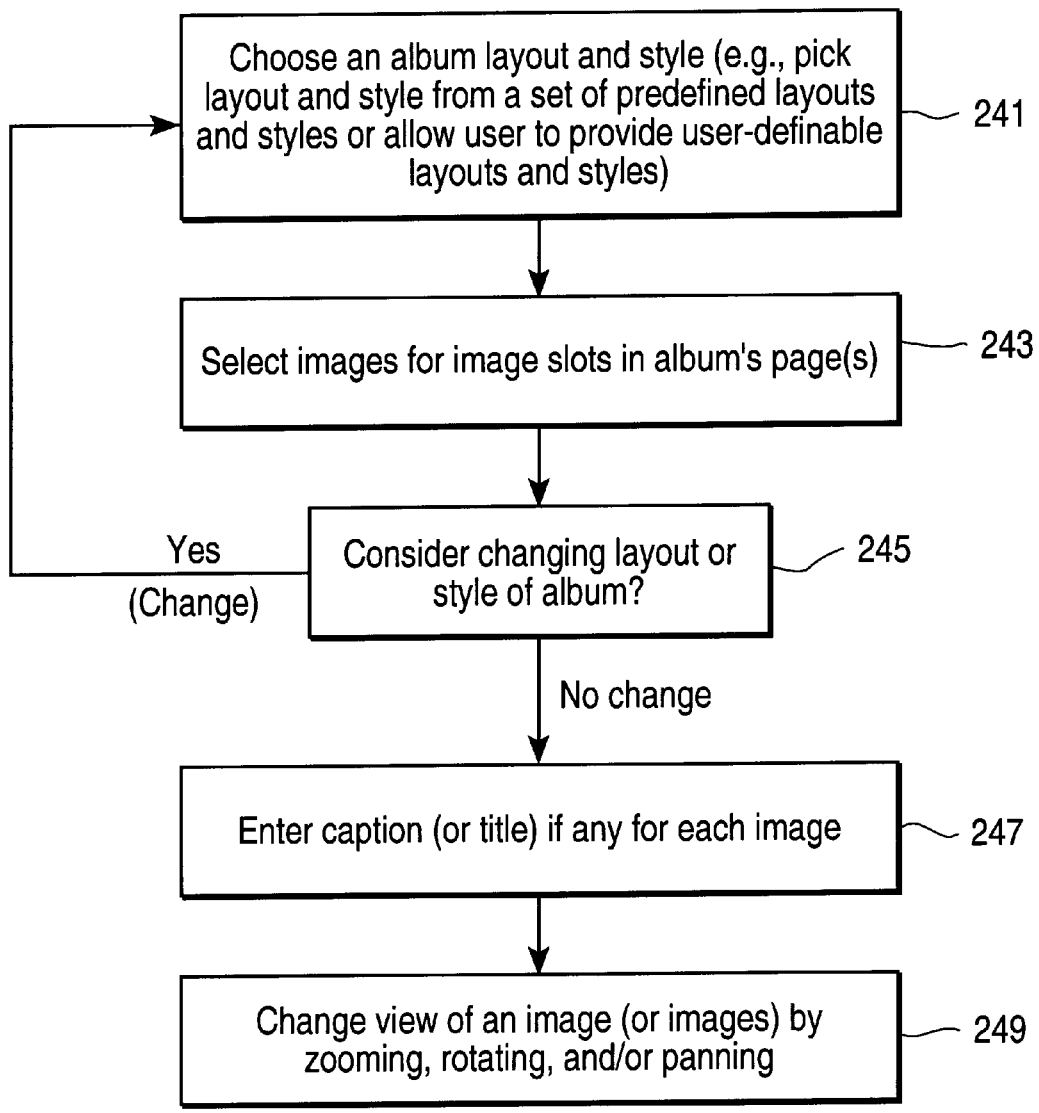
FIG. 3 is a flowchart illustrating one method for creating a picture album according to one aspect of the present invention.
Figure 12A:
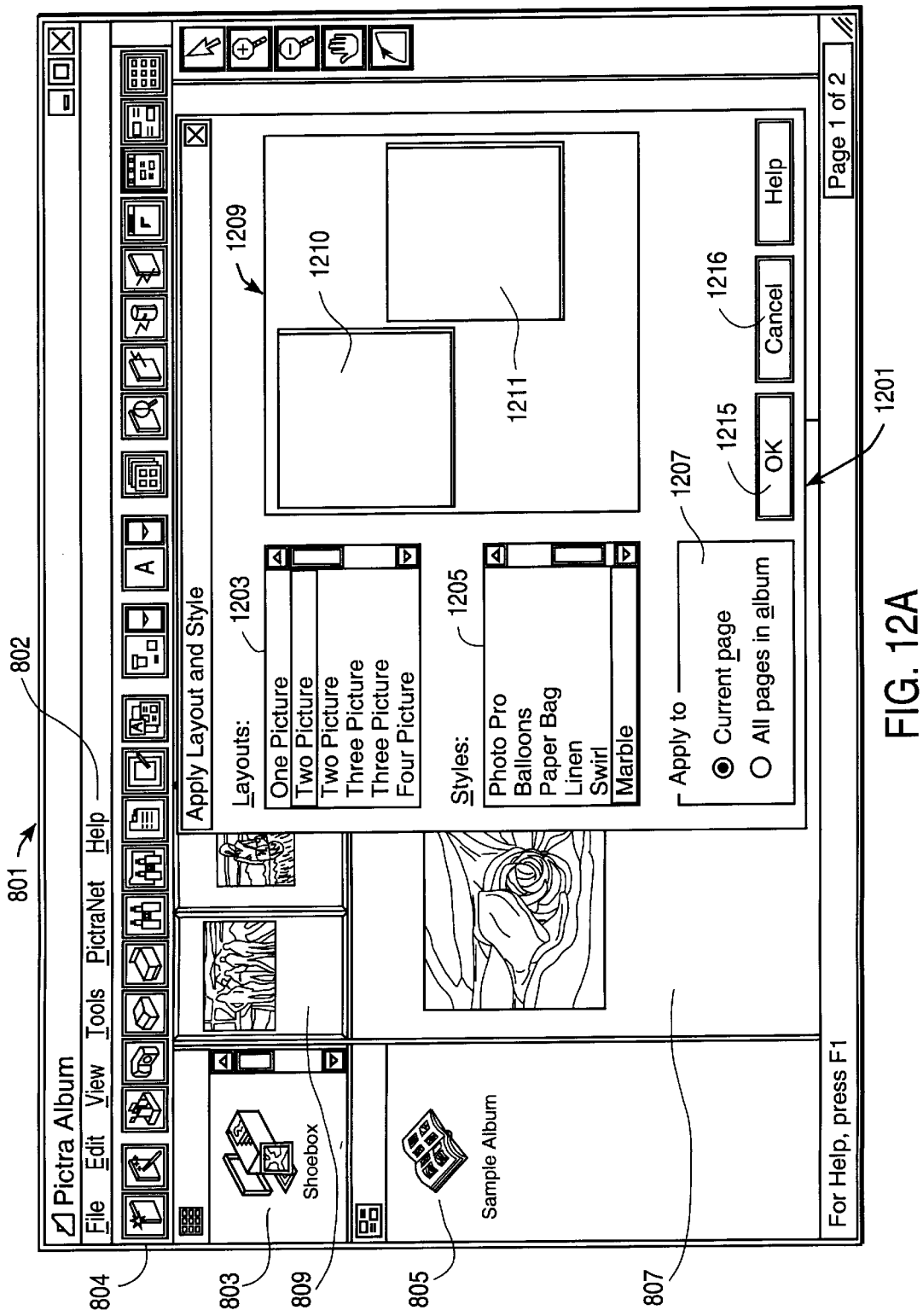
FIGS. 12A, 12B, 12C, 12D, 12E and 12F show various aspects of a graphical user interface of an album authoring software according to one aspect of the present invention.

In one aspect of the present invention, a user of a computer system, such as the computer system shown in FIG. 2, may create a media container which presents a collection of digital media in the media container. In one particular example of the present invention, the media container is a digital picture album and the digital media are digital pictures. FIG. 3 shows one typical method of creating a picture album. It will be appreciated that the sequence of steps shown in FIG. 3 is arbitrary and that other sequences are possible depending on the way in which the user interacts with the computer system on which the picture album is being created. In step 241, the user of the computer system chooses an album layout and style. This involves picking a particular layout and style from a set of pre-defined layouts and styles. Examples of these layouts and styles are shown in FIG. 12A which will be described below. In an alternative embodiment, the user is allowed to provide user definable layouts and styles. In step 243, the user selects images for the various image slots on the album's pages. Examples of these image slots are shown as slots 1253a and 1253b on album page 1253 shown in FIG. 12E. In step 245, the user considers whether or not to change the currently selected layout or style of the album. The user may at any time change the style or layout, and the album will automatically and dynamically reformat itself according to one aspect of the present invention. This will be described further below. If the user decides to change the layout or the style, processing returns to step 241. If no change is desired, then processing proceeds from step 245 to step 247. At this point, the user may enter a caption or title, if any, for each of the images. In step 249 the user may change the view of an image by zooming, rotating, and/or panning the image. As noted above, the user may perform these various steps in a different sequence. For example, the views of an image may be modified after an image has been selected for a particular slot in step 243. The captions may be entered after changing the view rather than before changing the view as shown in FIG. 3. It will be appreciated that other sequences for these steps may be performed as well.

Figure 4:
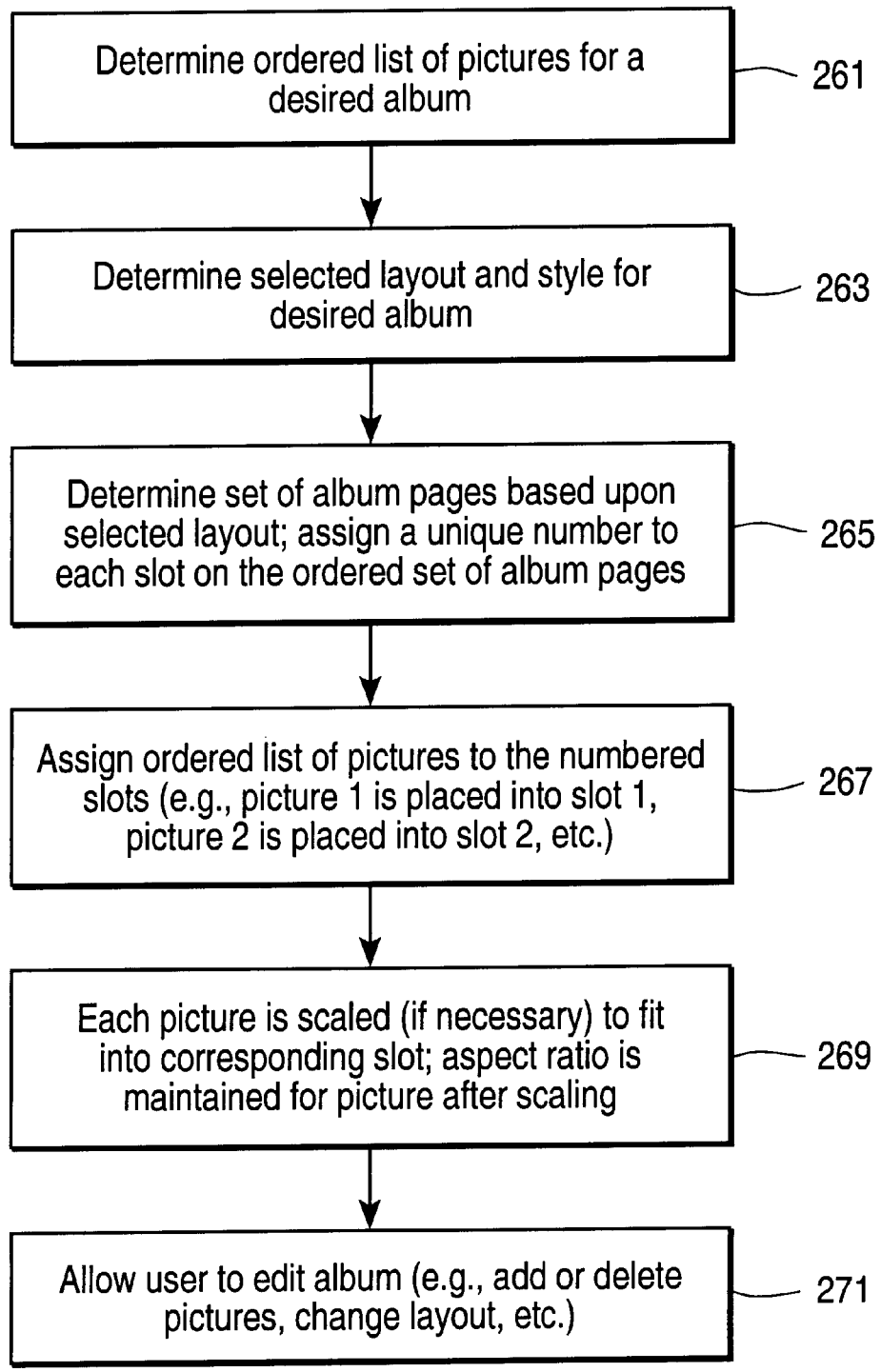
FIG. 4 is a flowchart illustrating one example of a method of creating a picture album according to one aspect of the present invention.

While the user of the computer system is creating a picture album, the computer system assembles the album by performing a number of operations. FIG. 4 shows one example according to one aspect of the present invention for creating a media container, such as a picture album according to one aspect of the present invention. In step 261, the picture album authoring software determines an ordered list of pictures for a desired album. Typically, the user will have selected certain pictures for a desired album and these pictures are put in an ordered list. The order of the pictures in the list may be changed by the user. This will be described further below in connection with the dragging and dropping of thumbnails in the thumbnail region of a graphical user interface according to one aspect of the present invention. In step 263, the album authoring software determines the selected layout and style for the desired album. This will typically be performed by receiving input from a user, such as input derived from a graphical user interface for the layout and styles (see, for example, FIG. 12A). In step 265, the album authoring software determines the set of album pages based upon the selected layout. Further, the album authoring software assigns a unique number to each slot on the ordered set of album pages. Then in step 267, the album authoring software assigns the ordered list of pictures to the numbered slots on the album pages. For example, picture 1 in the ordered list of pictures is placed into slot 1 which would typically be on page 1 of the album. Picture 2 in the ordered list of pictures is placed into slot 2 which may be on page 1 of the album or on page 2 of the album. This assignment is performed for all pictures in the ordered list of pictures currently selected by the user for this particular album. In step 269, the album authoring software scales each picture if necessary to cause it to fit into the corresponding slot on the album page. The aspect ratio of the picture is maintained after the scaling operation. The scaling operation is performed using conventional scaling techniques which achieve the same aspect ratio after the scaling operation. That is, the aspect ratio (height and width) of the original picture is the same as the aspect ratio of the picture as scaled to fit into the assigned slot on the album page. This will be described further below in conjunction with FIG. 15. In step 271, the album authoring software allows the user to edit the album. These editing options include adding or deleting pictures, changing the layout, editing each picture (e.g. by panning, zooming, and/or rotating), etc. It will be appreciated that editing of the album may invoke the process of FIG. 6B to be repeated beginning with step 261 in which the album authoring software determines a new ordered list of pictures. For example, if an additional picture is added, the list of ordered pictures is changed and an additional album page may be added if an available slot on an album page does not exist.

Figure 5:
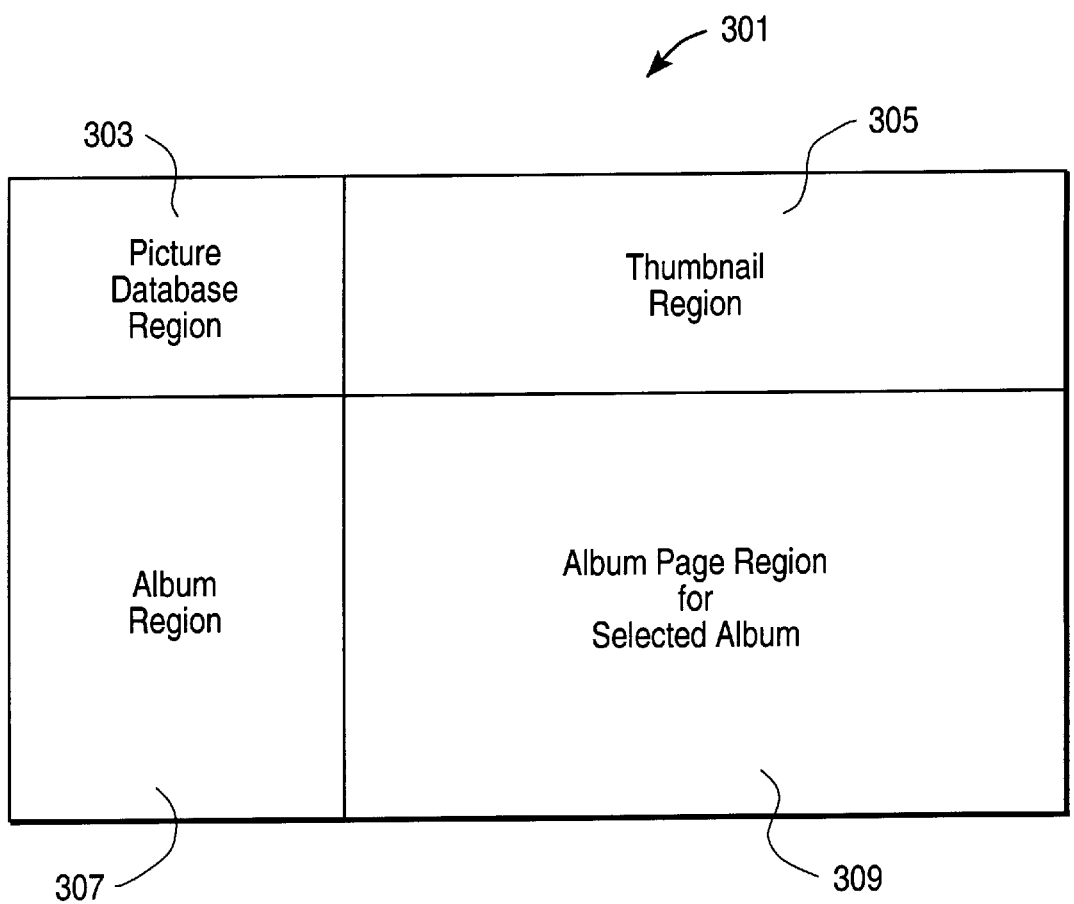
FIG. 5 shows a generalized window for an album authoring software according to one aspect of the present invention.

FIG. 5 shows a generalized example of a window 301 for an album authoring software according to one aspect of the present invention. The window 301 includes four regions which may be displayed simultaneously to the user of the computer system. In one aspect of the present invention however, the view provided to the user may show only two of these regions at one time. This will be described further below. The four regions of window 301 are the picture database region 303, the thumbnail region 305, the album list region 307, and an album page region 309 for a selected album. The picture database region 303 displays an icon or other representation of a database which is maintained for all pictures which have been inputted into the album authoring software of the present invention (whether or not these pictures are in any album). Further details concerning this database will be described with reference to FIGS. 6 and 7 below. The picture database region 303 also displays icons or representations of existing albums which have been created using the album authoring software of the present invention. The thumbnail region 305 displays miniaturized thumbnail versions for the images in either the entire database (if the icon for the database is selected) or for the particular album if the icon in the region 303 for that album has been selected. See, for example, FIGS. 12E and 12F; in FIG. 12E, the shoebox icon, which represents the picture database for all pictures inputted into the album authoring software of the present invention is shown as open, thereby causing the display of thumbnails 1251 of all of the images in the picture database. In FIG. 12F, the shoebox icon 803a is shown as closed and the sample album icon 1242a is shown as opened thereby causing the thumbnails 1265 to be displayed; these thumbnail images show only those images in the particular sample album which is selected, in this case, the album represented by the opened sample album icon 1242a in the picture database region of the window 1260. The album list region 307 displays icons or representations of the various albums which have been created using the album authoring software of the present invention. The user may select a particular icon in the album list region 307 thereby causing a page to be displayed from that selected album in the album page region 309. FIG. 13 shows an example of the page 1261 from the sample album represented by the sample album icon 805. Note that in FIG. 13, a different album, album 2 represented by the album icon 1275 has been selected in the picture database region 303 which causes the thumbnail 1271 to be displayed in the thumbnail region, which has been labeled as region 1273 shown in FIG. 13.

Before describing further aspects of the user interface for the album authoring software of the present invention, it is useful to understand one aspect of the present invention which involves a picture database which may be maintained on the computer system which uses the album authoring software. It is also useful to understand how one computer system which uses the album authoring software may interact with another computer system, referred to as a server computer system in order to publish the album onto a network of computers for other users to view the album. Further details with respect to this aspect are also described in copending application entitled "Methods and Apparatuses for Distributing Digital Media Over a Network," by inventors Shantanu Narayen, Wu Wang, Steve Morris, Chan Chiu, Cecilia Zhao, Aditya Khosla, James Lei, and Prasad Kongara, Ser. No. 08/957,224, which was filed on Oct. 24, 1997. This copending application is hereby incorporated herein by reference. The server computer system typically also maintains a database for albums received from client computer systems which were authored using the album authoring software of the present invention. In one example, the server computer system may be the server system 111 shown in FIG. 1 which interfaces with a client computer system through the web server 109. The client computer system may be system 121 which is executing the album authoring software of the present invention. It will be appreciated that the web server system 109 and the server computer system 111 may be one computer system running software providing both the web server functionality as well as the server functionality of computer system 111.

Figure 6:
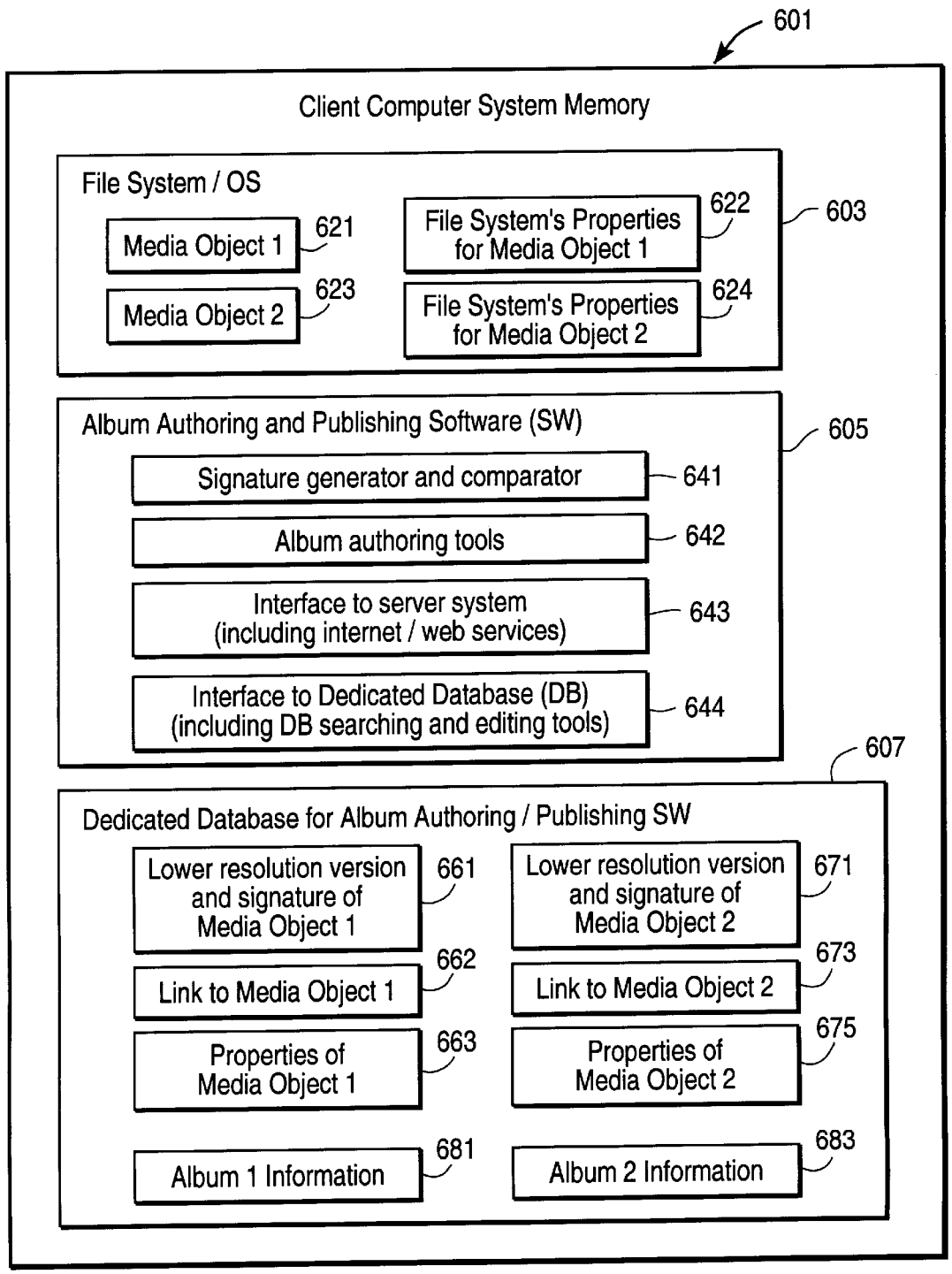
FIG. 6 shows an example of a computer readable storage medium for a client computer system which may be used with one aspect of the present invention.
Figure 7:
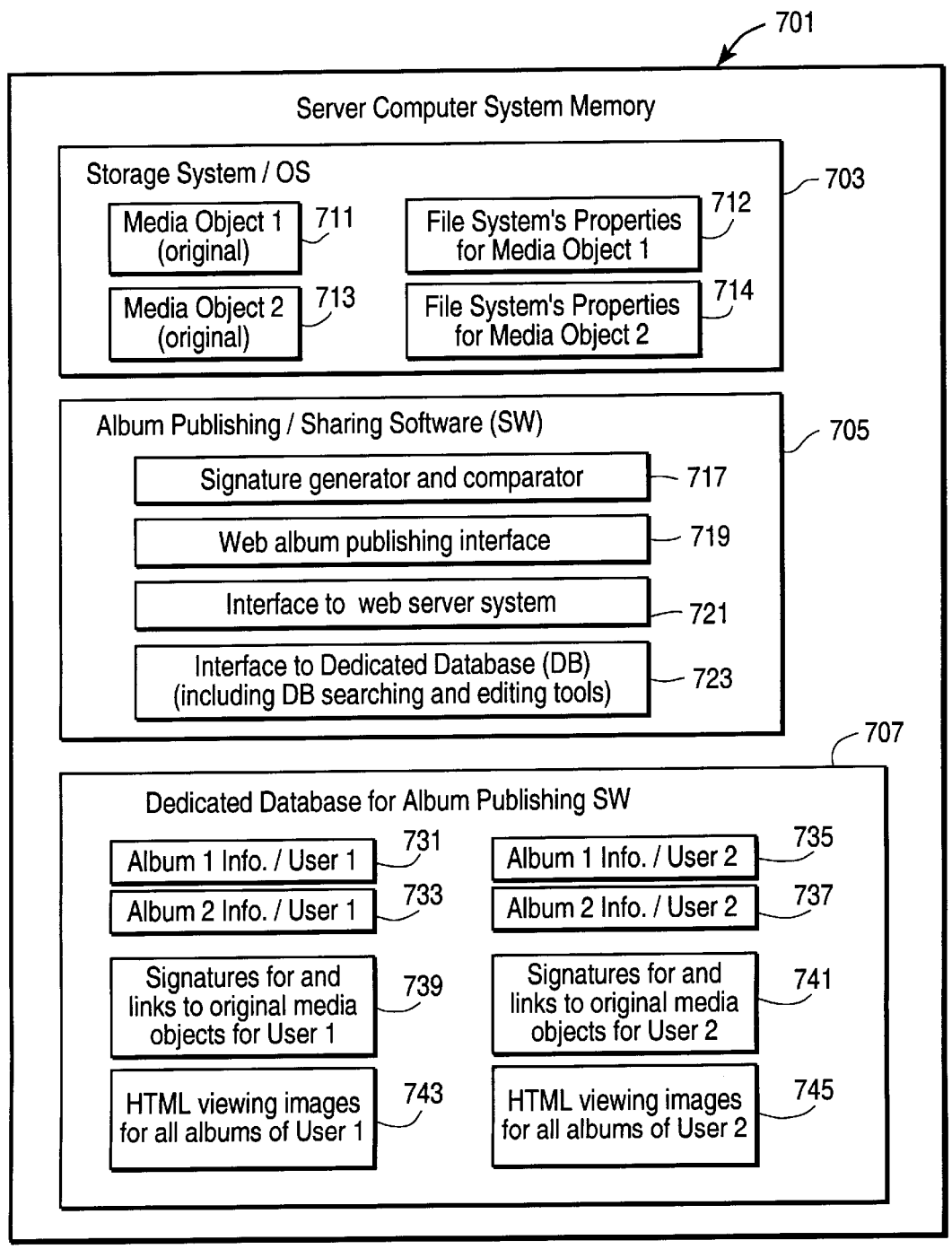
FIG. 7 illustrates a computer readable storage medium for a server computer system which may be used with one aspect of the present invention.

FIGS. 6 and 7 illustrate examples according to one embodiment of the present invention for two different computer readable storage media. It will be appreciated that the actual memory which stores this information may be different elements, such as the memory 509 and the mass memory 515 or they may be the same element, such as the mass memory 515. In one example of a network computer where there is no non-volatile mass memory, the necessary software files and data files may be downloaded to the memory 509 for execution in a processor in a network computer. In this case, the memory 509 provides the computer readable storage medium.

FIG. 6 illustrates an example of a computer readable storage medium containing various elements which are used with one embodiment of the present invention. The medium 601 includes a file system and an operating system (OS) element or module 603 which is used to control the file system for the client computer system as well as providing the operating system support such as the disk operating system and other aspects of the operating system. Another element is the album authoring and publishing software 605 which is used to create and modify albums and to interface with the server system in order to publish and/or share those albums. Another element is a dedicated database which is dedicated to the album authoring/publishing software. This database element 607 includes information for the various pictures in the various albums a user may create. While digital pictures represent one embodiment of the present invention, it will be appreciated that digital media or media objects refers generally to audio digital media, video digital media and software files, such as a word processing file created by a word processing computer program. However, the preferred embodiment is one in which the digital media or digital pictures are assembled into a picture album, where the album has multiple pages and where at least some of the pages include multiple pictures.

As shown in FIG. 6, the file system/OS element 603 includes media objects 621 and 623 which are the actual binary data of two different media objects, media object 1 and media object 2, stored on a hard disk or other media under control of the disk operating system. The disk operating system creates file system properties, such as properties 622 and 624 which specify various file system related properties for the two media objects. These include file size, date of creation, and document type (e.g. JPEG, BMP, etc.). The album authoring and publishing software element 605 includes four modules 641, 642, 643, and 644. The signature generator and comparator 641 is the executable computer program for generating and comparing the signatures or representations according to the present invention. The album authoring tools 642 allows a user to create a picture album by selecting layout information which specifies the number and location of pictures on a page throughout multiple pages of a picture album. The interface to server system module 643 includes Internet and web services allowing the client computer system which includes the computer readable memory 601 to interface with a server system, such as the server computer 111 of FIG. 1. The interface to dedicated database module 644 includes database searching and editing tools allowing the album authoring and publishing software to search and edit the dedicated database 607.

FIG. 6 shows an example of the dedicated database 607. It will be appreciated that data may be stored in other formats and ways in this database. As shown in FIG. 6, for each media object, there is stored in the database a lower resolution version of the media object as well as the signature of the media object and a link to the original (higher resolution) media object as well as information indicating the properties of the media object. Thus, the lower resolution and signature of media object 1 is stored with a link to the original media object 621 stored in the file system as well as the properties of the media object 1, which properties are typically in addition to the file system's properties 622. Similarly, for media object 2, there is stored a lower resolution version, such as a thumbnail image, of the media object 2 and the signature or representation of the media object 2. There is also a link or pointer to the original media object 2 which is the media object 623 maintained by the file system. Further, there are properties for the media object 2 which are in addition to the properties 624. The database 607 further includes information specifying layout and other information for album 1, labeled as information 681, and information 683 specifies information for a second album which may include different pictures than album 1 or may include some of the same pictures as album 1.

In one embodiment, the client computer system's computer readable media 601 may at some time be entirely stored in non-volatile mass memory, such as a hard disk. At other times, the various elements shown in FIG. 6 may be dispersed between dynamic memory, such as memory 509, and a mass memory, such as mass memory 515.

FIG. 7 shows an example of the computer readable storage medium 701 which may be used with a server computer system of the present invention. This memory, which again may be dispersed among memory elements or may be stored entirely on a hard disk or other non-volatile storage media, includes three elements which are the file system/operating system element 703, the album publishing/sharing software 705, and the dedicated database for the album publishing software 707.

The file system and operating system element 703 includes the original, higher resolution media objects 1 and 2 shown as elements 711 and 713. These elements are the actual digital (or other) data of the media object stored on the computer readable medium under control of the file or storage system such as a disk operating system. The file or storage system also stores properties which are the file system's properties for the media object, such as properties 712 and 714. These properties typically include the file's size for each media object as well as the date of creation, the date of last modification and the type of document. The album publishing/sharing software 705 includes a signature generator and comparator module which is responsible for generating representations or signatures of the media objects and to compare signatures or representations in accordance with the present invention. The web album publishing interface 719 performs functions relating to decoding information with respect to the albums and generating albums as a result of decoding the information specifying album format. The interface to web server system 721 is an optional software module which is used to allow the server computer system 111 to interface with the web server 109. Typically, some services are required in order to interface between the album publishing and sharing software and the software required for providing web server functionality. The interface to the dedicated database element 723 provides for database searching and editing of the dedicated database 707.

The dedicated database 707 includes information 731 for a first album of user 1 and information 733 for a second album of user 1. It also includes information 735 for a first album of a second user and information 737 for a second album of the second user. There is also stored in the database 707 the signatures for and the links to the original media object for the first user. This information may be stored in separate tables or together in one table. The links point back to an original media object, typically by picture name and full path name to the original media object, such as media object 711 as stored in the file system. The signatures are used when comparing signatures received from the client system when connected with user 1 in the case of the signatures stored with element 739. Also for user 1, the database either stores or refers to a separate storage for the HTML viewing images for all albums of user 1. This element 743 is generated from the media object, such as the original media object 1 stored as element 711 in the file system. Typically, the HTML viewing images are a lower resolution version of the original media object and will be displayed to users when browsing the web server 109. The database 707 contains similar information, such as the elements 741 and 745 for the second user.

Figure 8A:
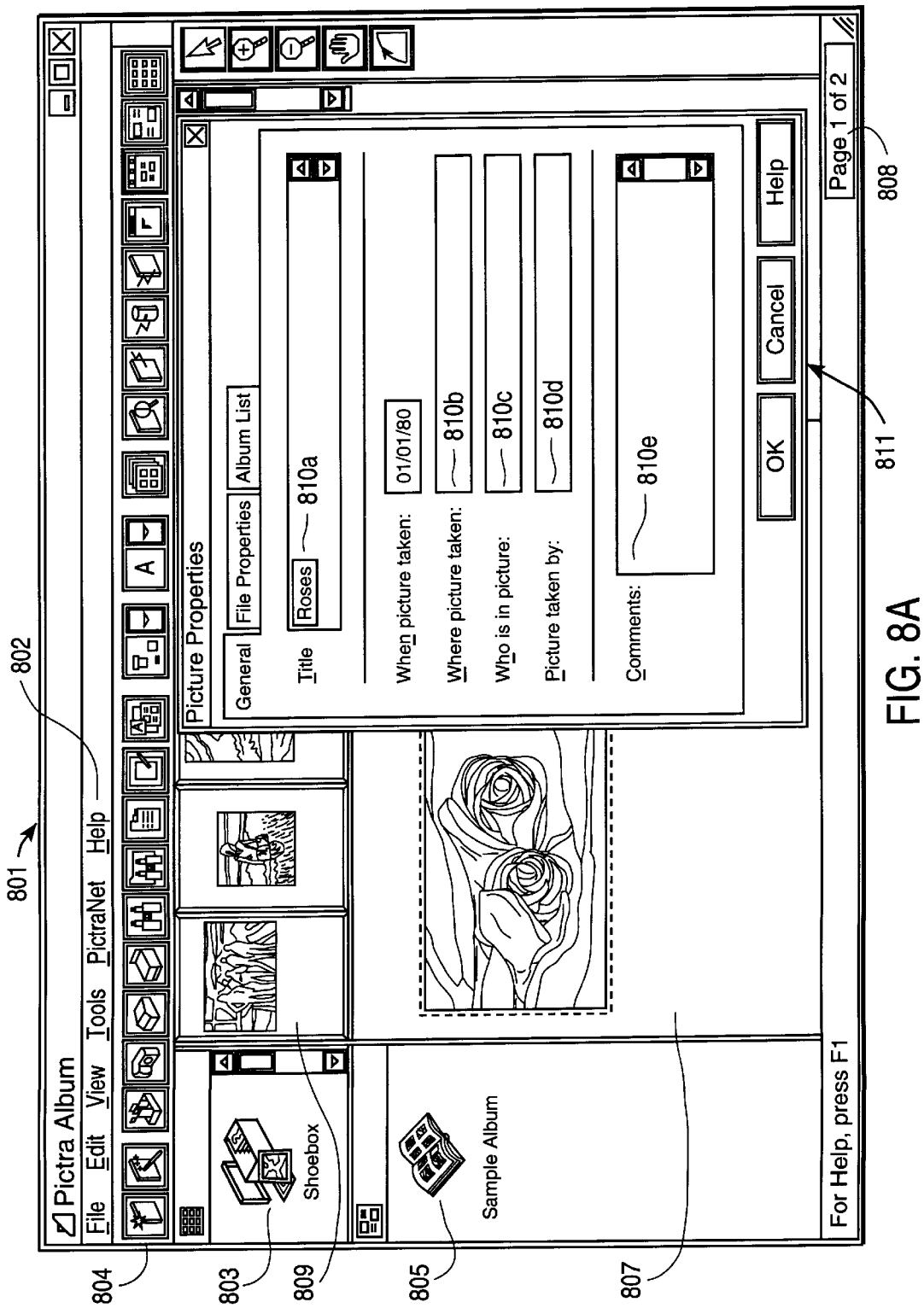
FIGS. 8A, 8B, and 8C illustrate a particular graphical user interface which depicts the various information which may be maintained in a picture database according to one aspect of the present invention.
Figure 8B:
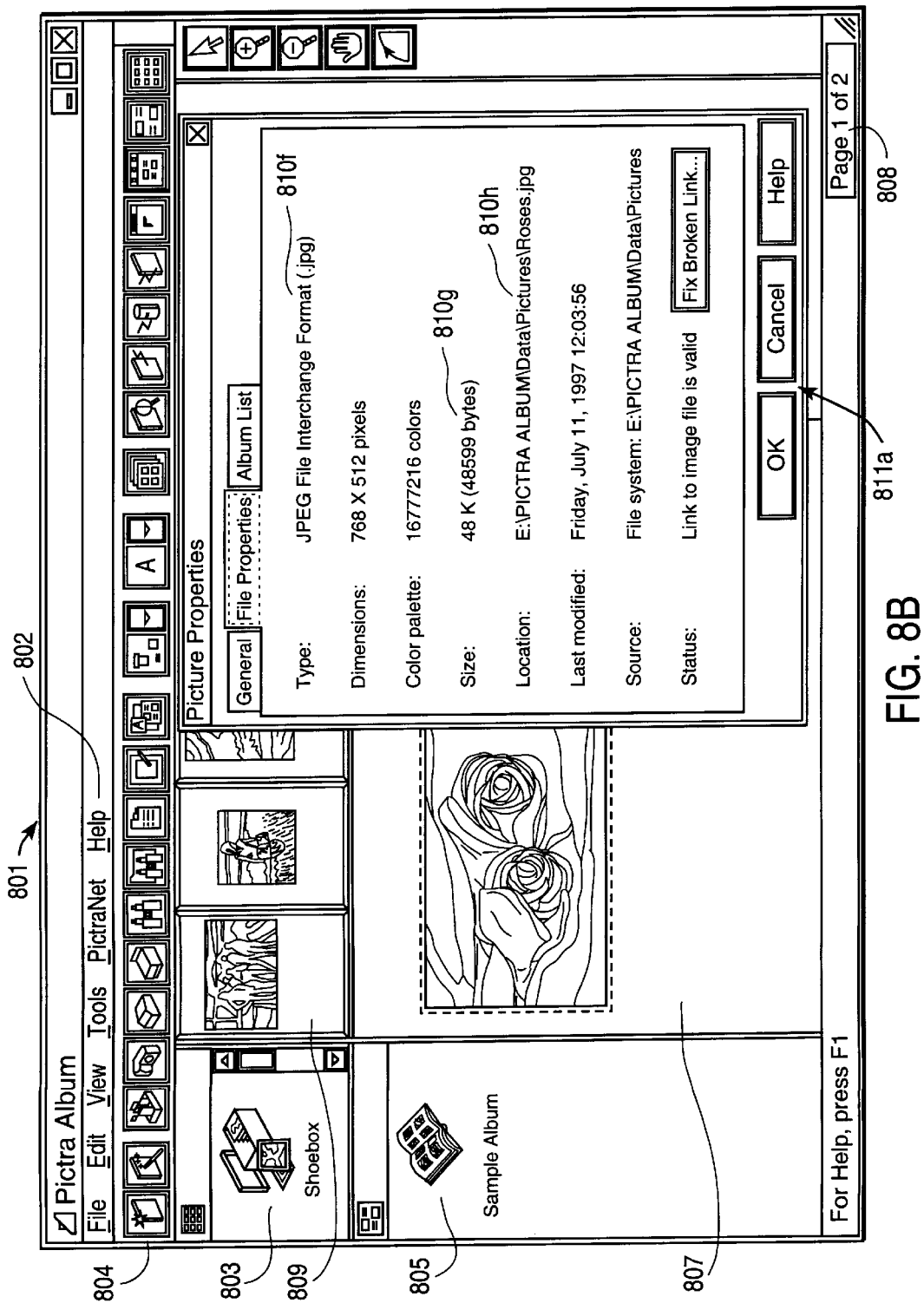
Figure 8C:
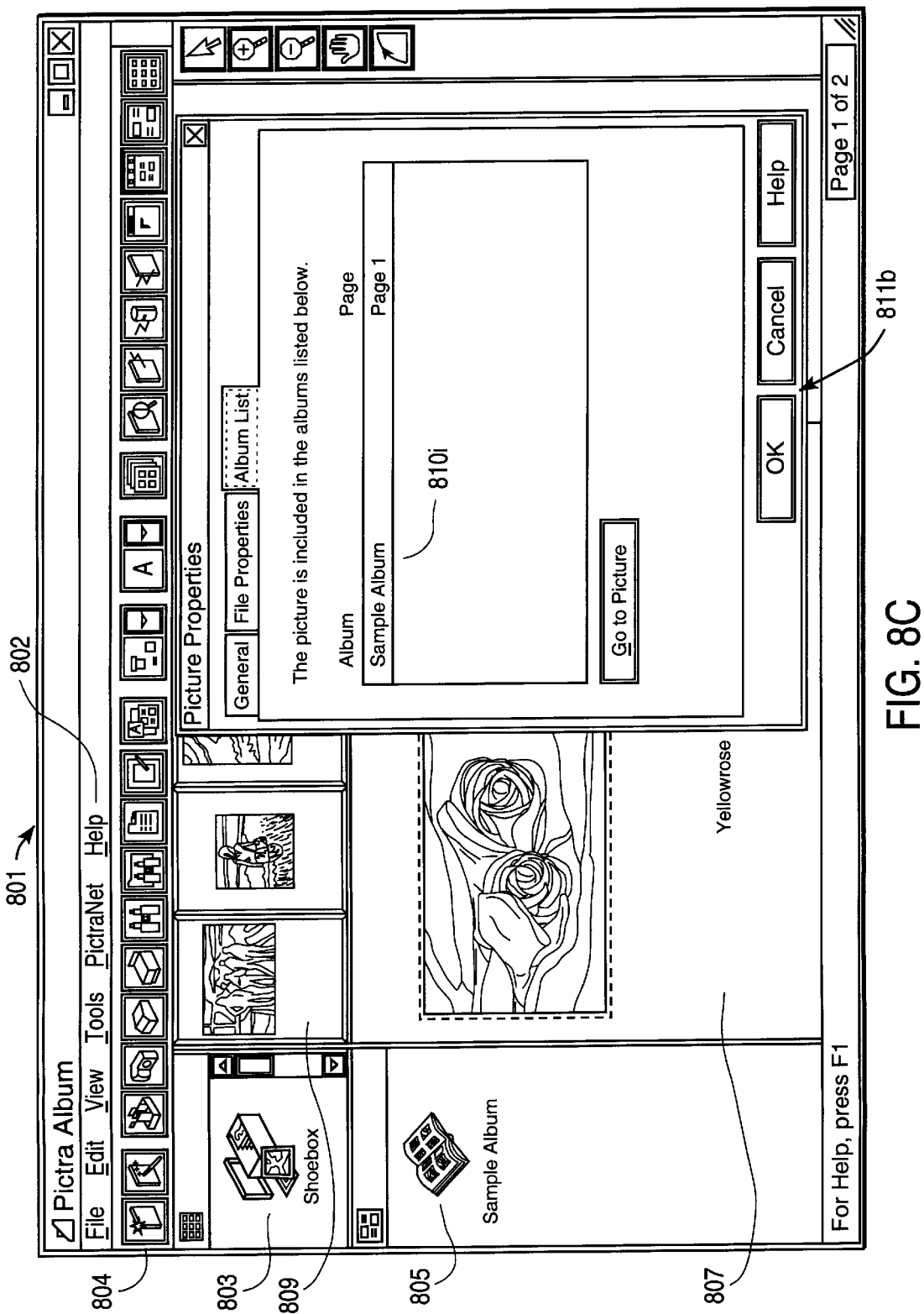

FIGS. 8A, 8B, and 8C show a graphical user interface for an album authoring software (which may also allow the album to be published) according to one aspect of the present invention. The window 801 includes a menu bar 802 which provides pull-down menus for various commands in the album authoring software of one aspect of the present invention. Below the menu bar 802 is a bar 804 with icons which represent various commands for the software. Immediately below this bar 804 is a picture database region which includes the opened shoebox icon 803. To the right of the opened shoebox icon 803 are several thumbnail images 809 in the thumbnail region of the window 801. Below the thumbnail region is a particular album page 807 which exists in the sample album which is represented by the opened sample album icon 805. On top of the window 801 is a picture properties window 811. This picture properties window indicates, in one embodiment of the invention, the various attributes and information which may be maintained in a picture database by the album authoring software of the present invention. In this particular example, the information includes title or caption information 810*a,* the date the picture was taken, where the picture was taken 810*b,* who was in the picture 810*c,* the photographer of the picture 810*d,* and comments 810*e.* It will be appreciated that the text information shown in window 811 is typically entered by a user; this text may be useful later when searching for a particular picture (e.g. such as searching for all pictures which have Jennifer and Lindsey in the picture which would be specified by information 801*c*). FIG. 8B shows another picture properties window 811*a* which includes the file size 810*g* and the full path name 810*h* for the particular image which was selected. This particular image is entitled "Roses" and is a JPEG file stored on the "E" drive. FIG. 8C shows one other picture properties window 811*b* which shows another attribute stored in a picture database in one embodiment of the present invention. This attribute shows which albums contain the particular selected picture. This feature is useful in order to search for all albums which contain a particular picture. For example, if the user of the computer system desires to delete the picture from all albums, this album list shown in window 811*b* will allow the user to find all such albums.

One particular aspect of the present invention relates to the creation automatically of a collection of digital media, such as digital pictures in a picture album, will now be described by referring to FIGS. 9, 10A, 10B, 10C, and 11.

Figure 9:
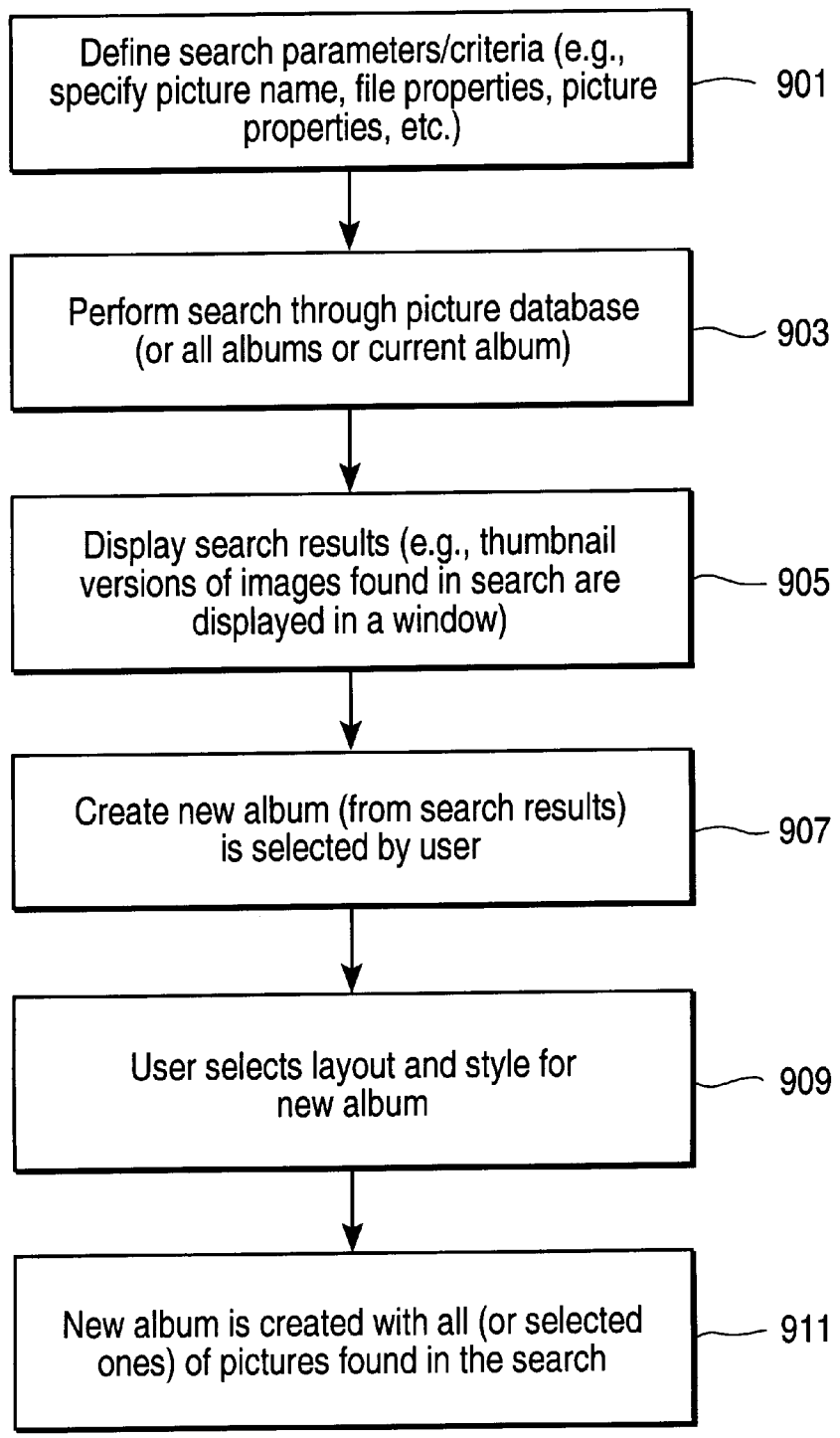
FIG. 9 is a flowchart depicting one example of a method of creating a picture album automatically from the search results of a search through a picture database.
Figure 10A:
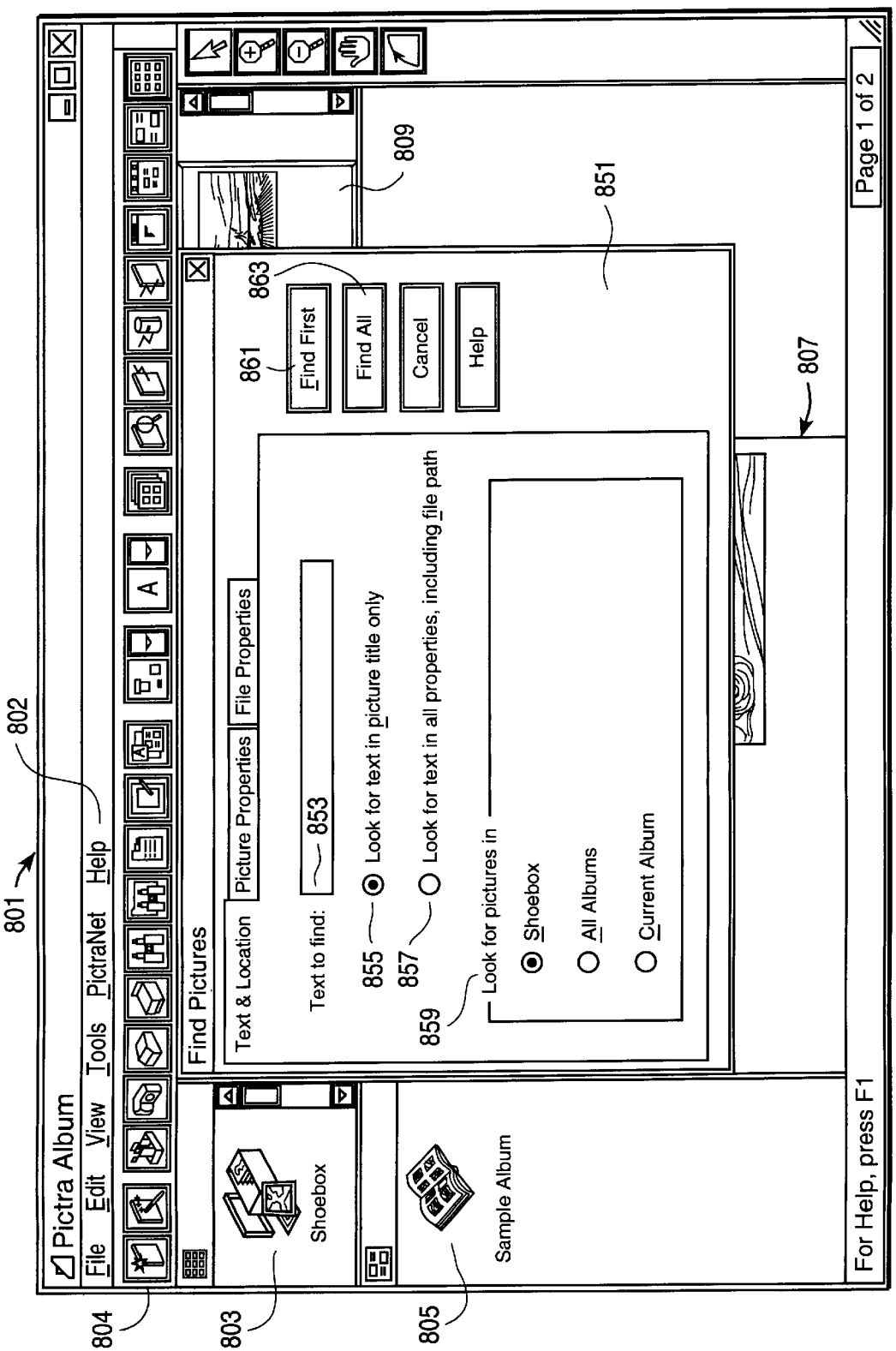
FIGS. 10A, 10B, and 10C illustrate a particular graphical user interface which indicates the various parameters which may be specified in a search query which may be used in a method such as that illustrated in FIG. 9.
Figure 10B:
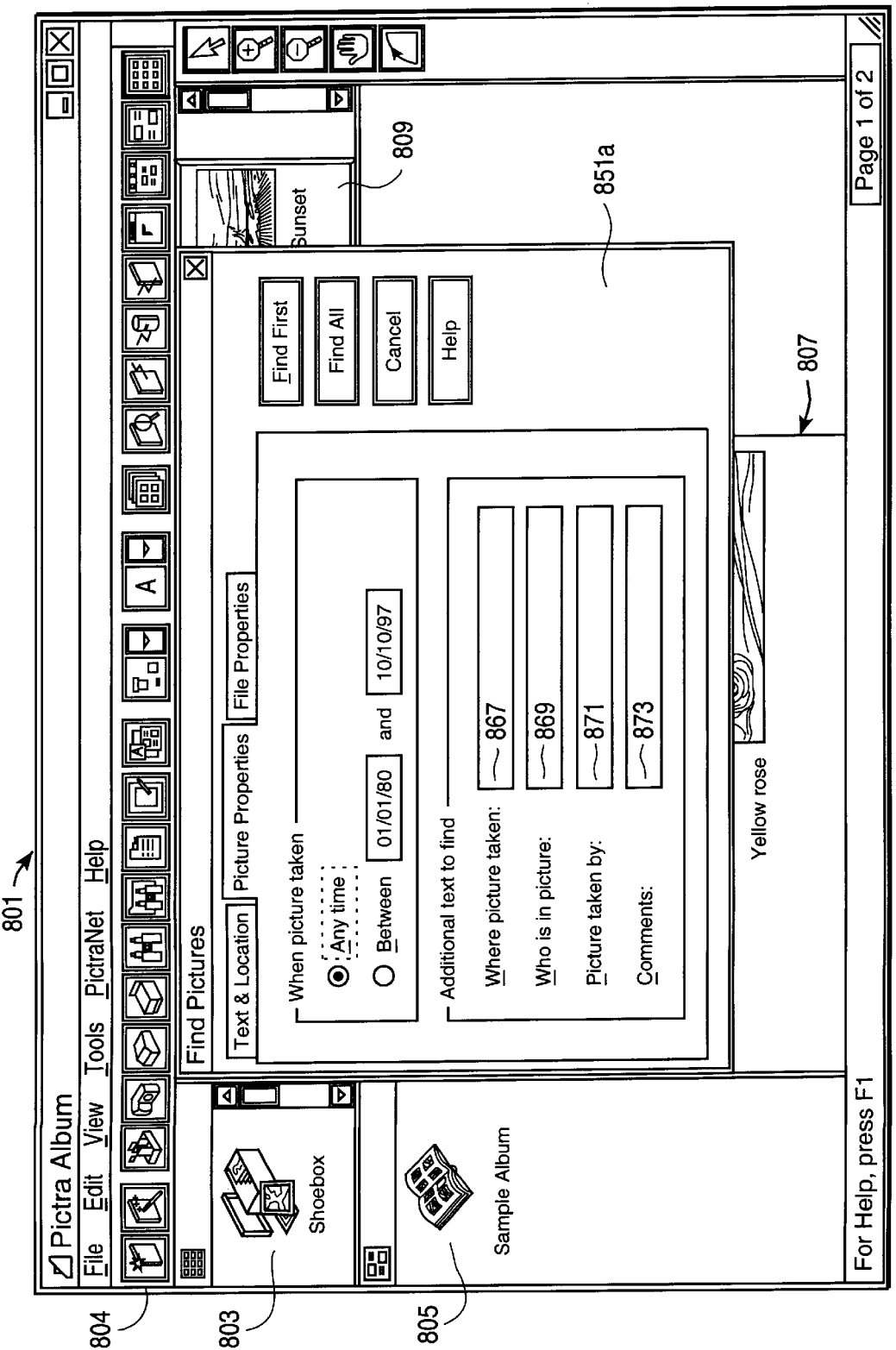
Figure 10C:
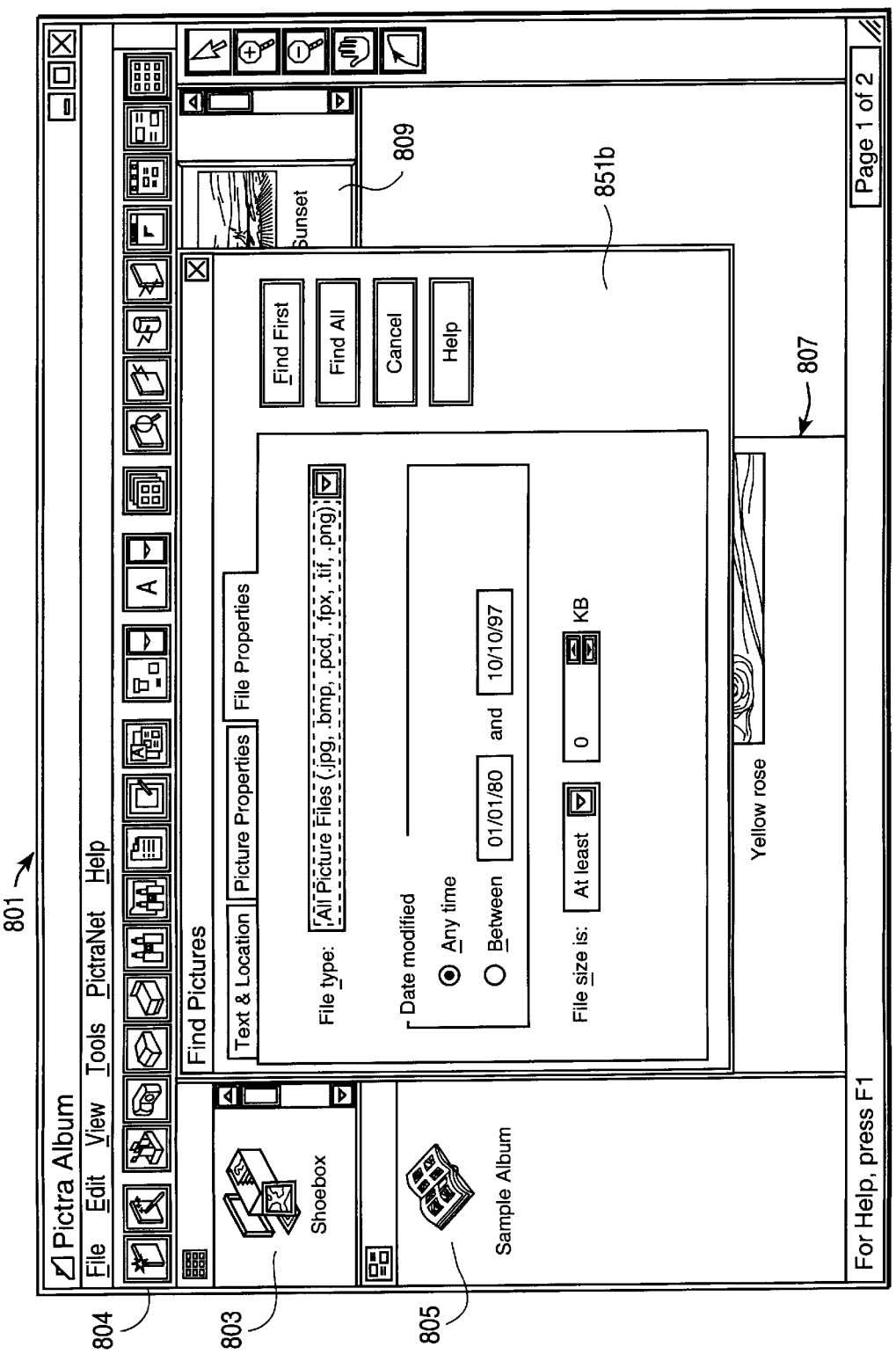

FIG. 9 illustrates one method for creating automatically a media container for a collection of digital media. The method will be described with reference particularly to a picture album as one example of this aspect of the present invention. In step 901, a user defines at least one parameter or criteria in order to perform the search. For example, the user may specify a picture name or a file property or a picture property. It will be appreciated that the term file property is meant to refer to picture properties which are also considered to be file properties such as those properties maintained by a file management system (e.g. file type or file size or last date of modification of the file). In step 903, the computer system then performs a search through a picture database which typically contains various picture properties, such as those shown in FIGS. 8A, 8B and 8C. The search determines whether there are any matches to the search criteria. In particular, the search determines whether the search parameters match the stored parameters in the picture database or in a particular album or in all albums. Thus the user may specify a search through only pictures in a particular album or all albums. This is shown further in FIG. 10A which also shows a find pictures window 851 which may be used to define the search criteria in step 901. In particular, the find pictures window 851 includes text field 853 into which a user may enter text which is to be found in the picture database. The user can specify by selecting radio button 855 that the search engine look for text in the picture title only. Alternatively, the user may, by selecting radio button 857, specify that the search engine look for text in all properties. The user may specify where to look by selecting one of the three radio buttons in the box 859. If the user selects the radio button "shoebox" then the search engine will search, using the specified properties through all pictures in the picture database. If the radio button "all albums" is selected in the box 859, then the search engine will search for only pictures in all albums rather than for all pictures in the picture database. Thus, if a particular picture in the picture database is not in any album, then this picture will not be found. Further, the user may, by selecting the "current" album radio button in box 859, search only the current album. The user may select finding all the pictures which match the search criteria by selecting the button 863. Alternatively, the user may select to find only the first picture by selecting the button 861. FIGS. 10B and 10C show further parameters or criteria which may be specified as part of the search parameters. In particular, find pictures window 851a of FIG. 10B allows the search engine to look for certain parameters, such as parameters 867, 869, 871, and 873 as shown in FIG. 10B. As shown in FIG. 10C, the find pictures window 851b allows the user to specify a search for only certain file types or all file types and to search for any date or only dates between specified dates. It will be appreciated that the search engine performs a search using all the criteria specified in each of the three windows 851, 851a, and 851b. In an alternative embodiment, the user may be able to select only certain criteria to be used by the search engine.

Figure 11:
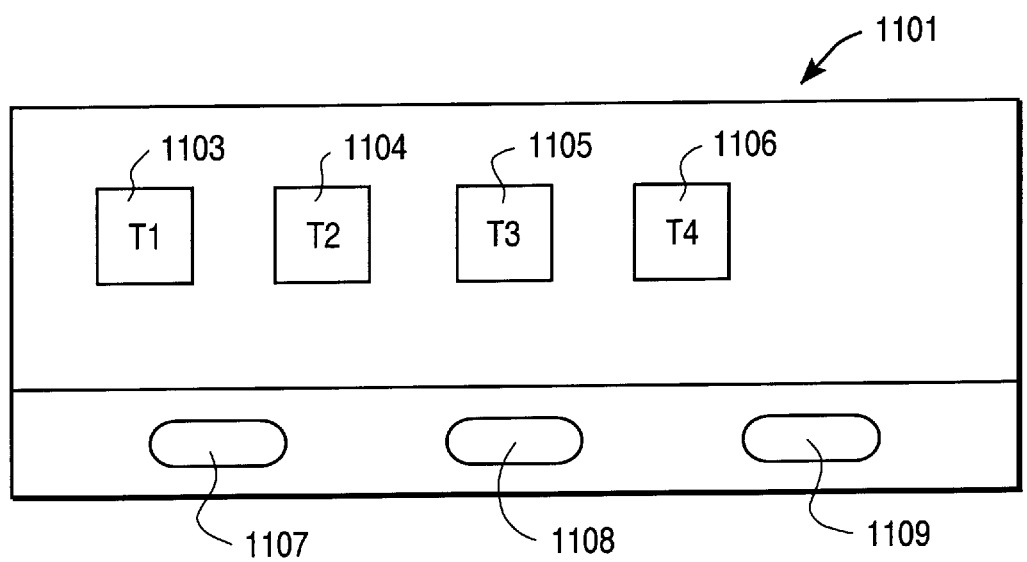
FIG. 11 shows one example of a window displaying the search results after a search which may be performed according to the method shown in FIG. 9.

After the search engine performs the search in step 903 of FIG. 9, the results of the search are displayed in step 905. In one example, a search results window 1101 shown in FIG. 11 may be displayed along with thumbnails of each of the images found in the search. As shown in FIG. 11, four thumbnails 1103, 1104, 1105, and 1106 are displayed in the search results window 1101 after the search is performed. Two radio buttons 1107 and 1108 are provided for the user to instruct the system what to do with the search results. The button 1109 may be provided in an alternative embodiment. The button 1107 allows the user to cancel any further operations and closes the search results window 1101. The button 1108 allows the user to create a new album from the search results. If this button 1108 is selected, then step 907 of FIG. 9 occurs and the album authoring software of the present invention will then automatically generate after the search a picture album containing the selected pictures which were found in the search. In an alternative embodiment, the user may select the button 1109 which allows the user to pick or select particular pictures displayed within the search result window 1101. In this manner, the user may automatically create a picture album from some but not all of the images displayed in the window 1101 by performing a conventional multiple select operation. For example, the user may move a cursor using a mouse or other cursor control device over each of the images in the window 1101 and select the images one at a time while holding down a key on the keyboard to indicate that a multiple selection is occurring.

After step 907 in which the computer system has been instructed to create a new album automatically from the search results, the user selects in step 909a particular layout and style for the new album. Then in step 911 the computer system automatically generates the new album with all of (or selected ones) of the pictures found in the search. After step 911, the computer system may then display the new album by displaying one page of the album in the album page region 309.

Various other aspects of the user interface of the album authoring software of the present invention will now be described. FIG. 12A shows a graphical user interface provided by the album authoring software in one embodiment of the present invention. The window 801 is partially covered by the layout and style window 1201. The layout and style window 1201 allows a user to select a particular layout from a list of various layouts 1203. This window also allows the user to select a particular style from a list of various styles 1205 shown in the window 1201. The preview window 1209 shows the currently selected layout and style. Thus as shown in FIG. 12A, the preview window 1209 shows a two-picture layout with the picture slots 1210 and 1211 staggered on the album page shown in the preview window 1209. The user may then select the particular layout by clicking the OK button 1215 or may cancel the selection and close the window 1209 by clicking the cancel button 1216. It will be appreciated that the term "click" refers to a well known graphical user interface technique whereby a user positions a cursor, typically with a cursor positioning device such as a mouse, over a particular screen object and then depresses a mouse button or some other button coupled to the computer system to select the displayed screen object. As shown in FIG. 12A, the layout and style window 1201 includes a box 1207 which allows the user to select one of two different radio buttons. The radio button "current page" allows the user to limit the application of the selected style and layout to the current album page. Alternatively, if the user selects the radio button "all pages in album" then the selected layout and style which has been selected in the window 1201 will apply to all pages in the current album. Thus, by selecting the current page radio button in the box 1207, the user may independently control the layout and style of each page in the picture album. For example, in the same album one page may have a two-picture layout, such as page 807 shown in FIG. 12B, and another page in the same album may have a four-picture layout such as page 1261 shown in FIG. 12F. In a particular embodiment of the present invention, the picture slots on each page are at a fixed, predetermined location. Thus the slots 1210 and 1211 shown in the preview window 1209 are fixed and may not be changed by the user. It will also be appreciated that the selected layout information for each page will be maintained in the picture database which is one aspect of the present invention. This picture database will typically also contain for each image in the album the thumbnail version of the image as well as a link or pointer or association for the image in the album back to the original full resolution image stored on the file storage device under control of a file management system operating on the computer system. The album information stored in the database along with the associated picture properties and pictures may be considered an entity which can be transmitted between computer systems, thus allowing the exchange of the album between computer systems or the publication of the album onto a web server.

Figure 12B:
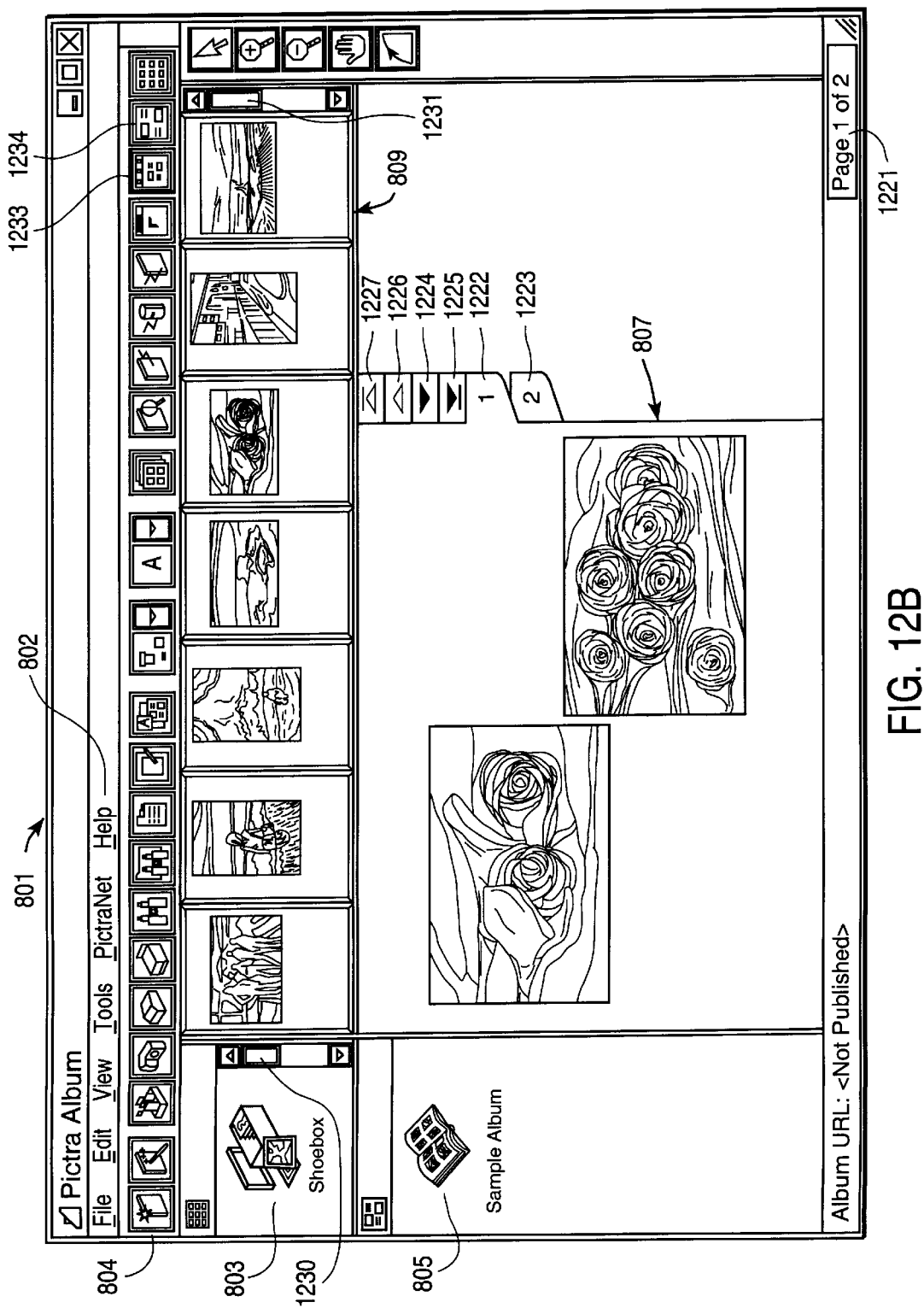

FIG. 12B shows a window created by one embodiment of the album authoring software of the present invention. The window 801 includes three icons 1233, 1234, and 804 which may be alternatively selected to provide different views to the user. The currently selected view shown in FIG. 12B is the thumbnail and album page view which may be invoked by clicking on the icon 1233. This causes the album authoring software to display thumbnails 809 in the thumbnail region for all the pictures in the picture database since the opened shoebox icon 803 has been selected. As can be seen from FIG. 12B, this picture database region which includes the shoebox icon 803 also includes the sample album icon which cannot be seen in this view. If the scroll bar region 1230 is used, then this icon may be seen in the picture database region. The album region includes the opened sample album icon 805. This icon is shown as open because a page from this album, page 807, is shown in the album page region. This particular page is a two-picture layout. As shown by the page indicator 1221, the user is viewing the first page of two pages of this sample album. This page may be selected by clicking on the tab 1222. The second page of the album may be selected for viewing by clicking on the tab 1223. Alternative navigation tools to move through the pages of the selected album include arrows 1224, 1225, 1226, and 1227. Arrow 1224 moves the user from one page to the next, and arrow 1226 moves the user from one page to the prior page. Arrow 1227 moves the user back to the very first page of the selected album, and arrow 1225 moves the user to the last page for the selected album. A scroll region 1231 is provided for the thumbnail region since not all thumbnails can be seen in the view shown in FIG. 12B.

The assigned order of pictures in an album may be changed by dragging and dropping the particular thumbnail from its current position in the thumbnail region to another position in the thumbnail region. It will be appreciated that the dragging and dropping operation is performed in the conventional manner by positioning a cursor over the particular thumbnail and selecting the thumbnail and then moving the cursor (with the thumbnail still selected by holding down the mouse button) to a new position. Thus, the thumbnail image at the far right of the thumbnail region shown in FIG. 12B may be changed from its current position to a different position by dragging this thumbnail to a new position. As described below, the picture album will automatically and dynamically reposition all pictures into the available picture slots by using a new ordered list of pictures and reassigning them to the ordered list of picture slots on the album pages. The order of the pictures in an album may also be changed by dragging selected pictures in an album's page to another position on the same page. The picture album will automatically and dynamically reposition all pictures into the available picture slots. The order of the pictures of a selected album in the picture database region 303 may be changed by dragging a thumbnail of a picture of the selected album to a new position in the thumbnail region 305; this may be done even if a different album is selected in the album list region 307.

Similarly, the user may add a picture to a picture album by selecting a thumbnail representation in the thumbnail region and dragging this representation onto a slot of a page displayed in the album page region. Thus, a user may select a different album in the picture database region and see the thumbnails for pictures in that album and open up another album in the album list region, causing an album page from that album to be shown in the album page region 309. Then a thumbnail from the thumbnail region may be dragged from the thumbnail region onto the album page in the album page region 309. In this manner a picture from one album is added to a different album which is the current album selected in the album region 307. As shown in FIG. 12B, the album list region 307 is the box surrounding the opened sample album icon 805, and the album page region 309 is the box surrounding the album page 807 in the lower right portion of FIG. 12B.

Figure 12C:
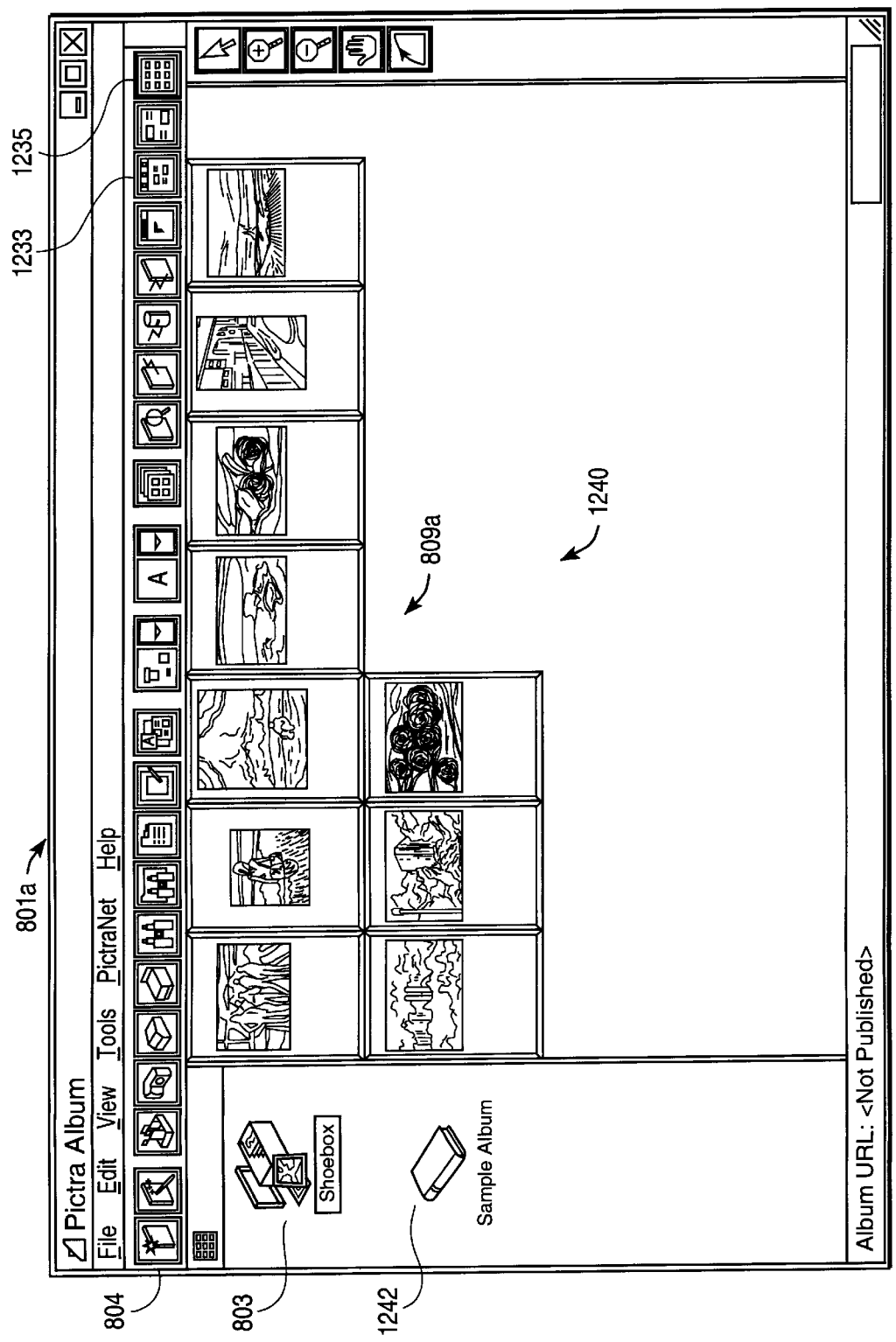

FIG. 12C shows another view provided by the album authoring software in one embodiment of the present invention. The view presented by window 801a includes the picture database region 303 which is the left portion of the window containing the opened shoebox icon 803 and the closed sample album icon 1242. The thumbnail region 1240 is the other portion of this window 801a. The thumbnail region 1240 shows all of the thumbnails 809a in the picture database represented by the opened shoebox icon 803. This view was selected by clicking on the icon 1235 which represents the thumbnail view.

Figure 12D:
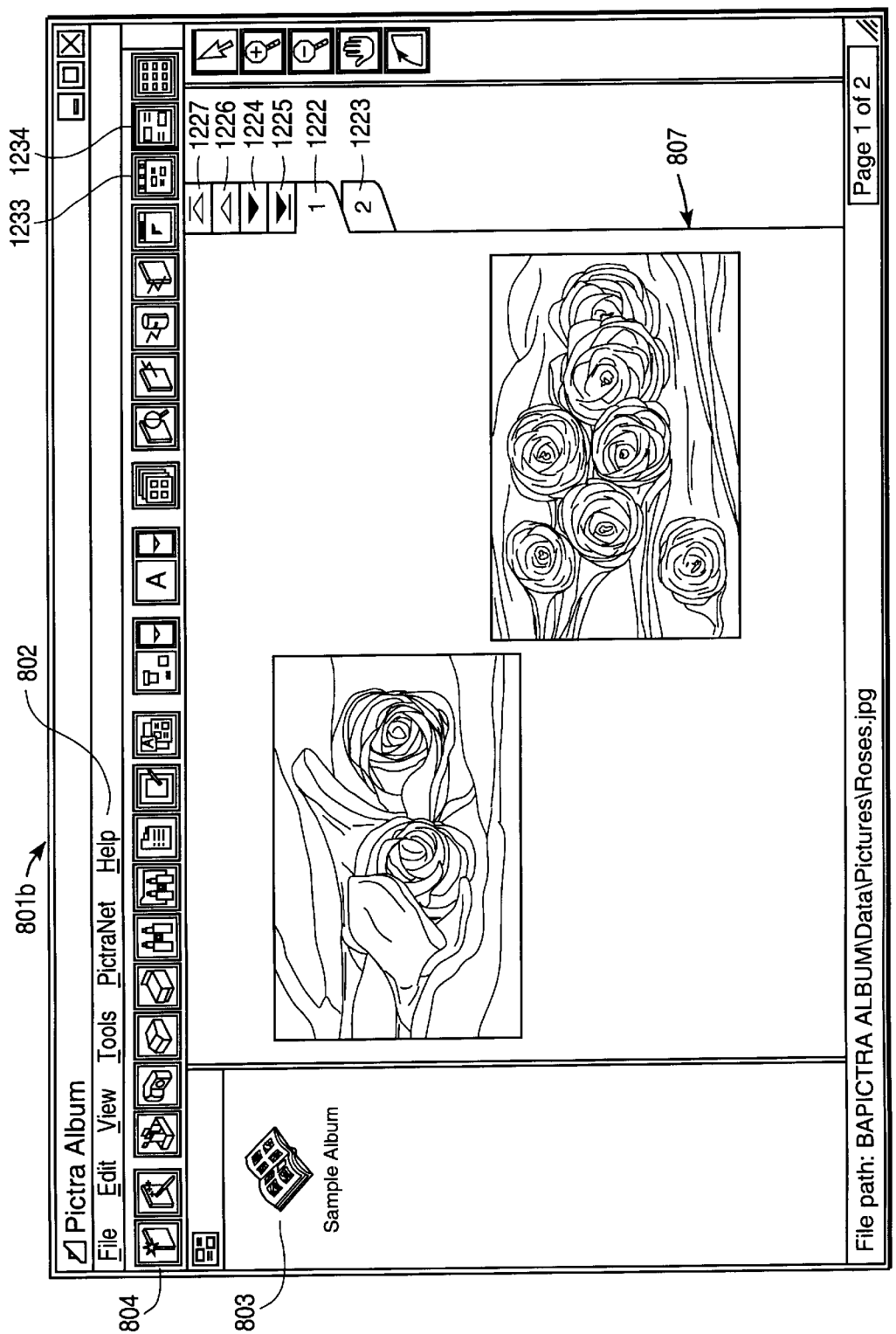

FIG. 12D shows an alternative view which is the album page view selected by clicking on the icon 1234. In this view, only the album page region 309 and the album list region 307 are shown. The album list region 307 is the rectangular box which surrounds the opened sample album icon 803. The album page region 309 is the rectangular region which surrounds the album page 807.

Figure 12E:
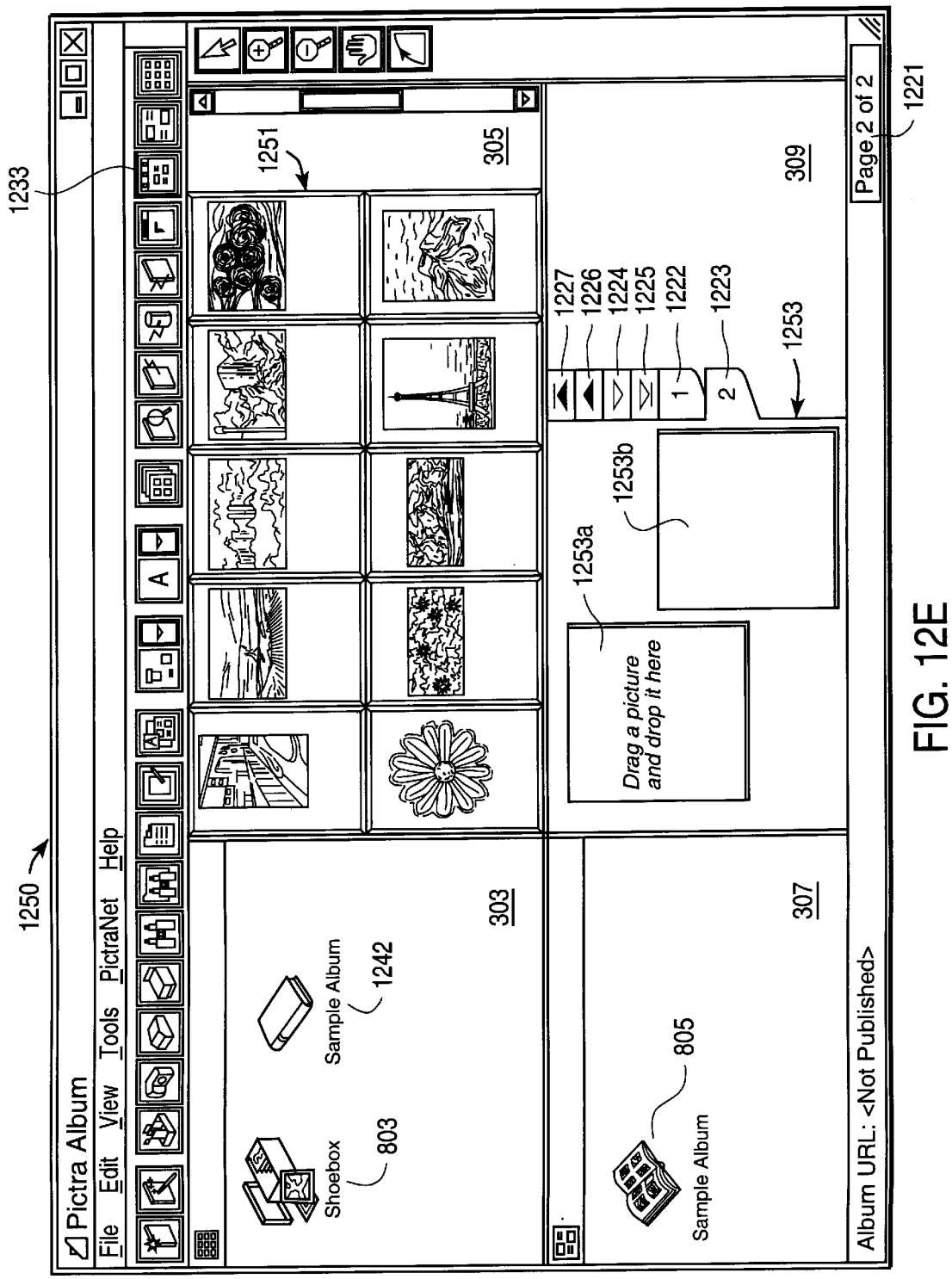
Figure 12F:
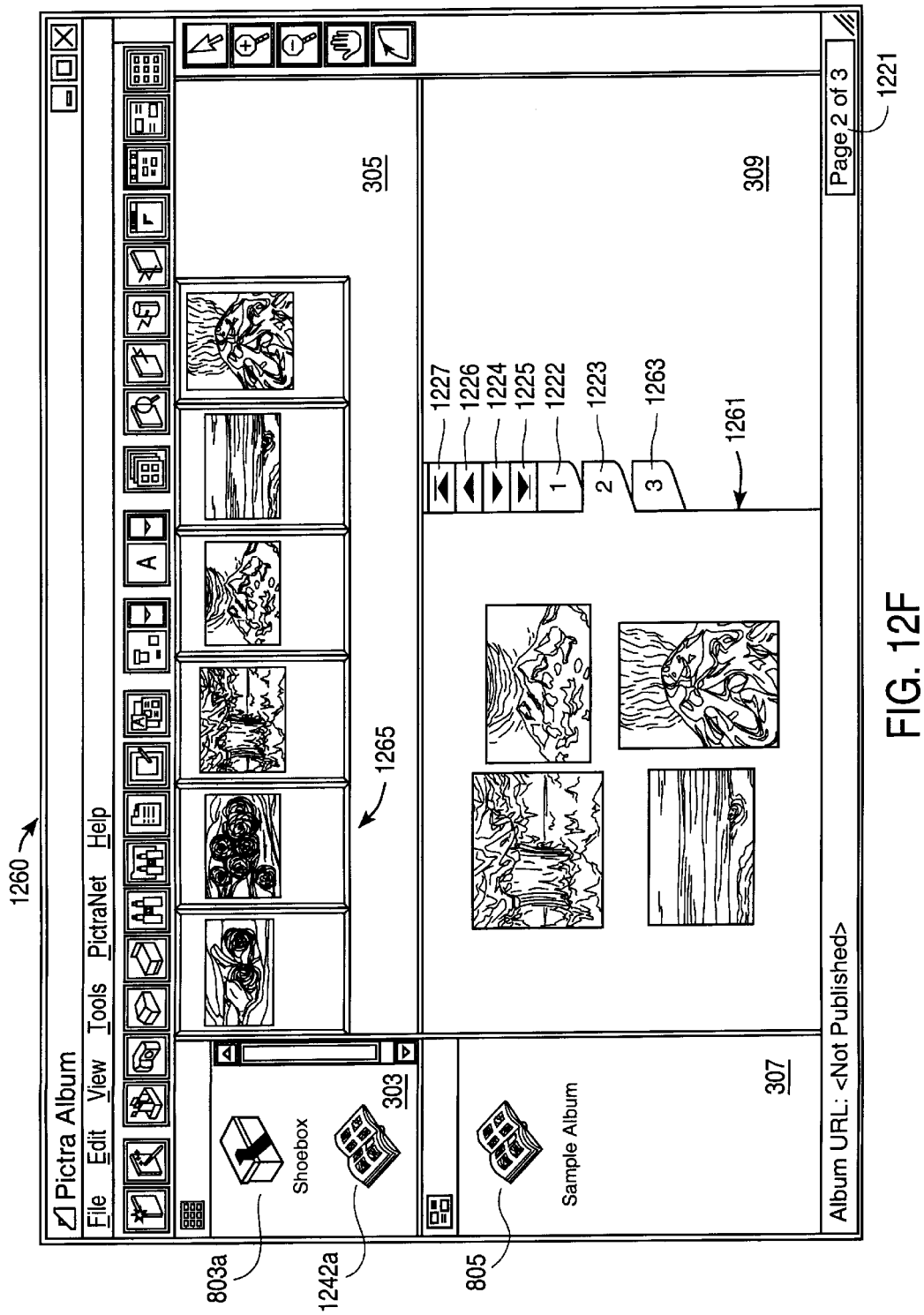
Figure 13:
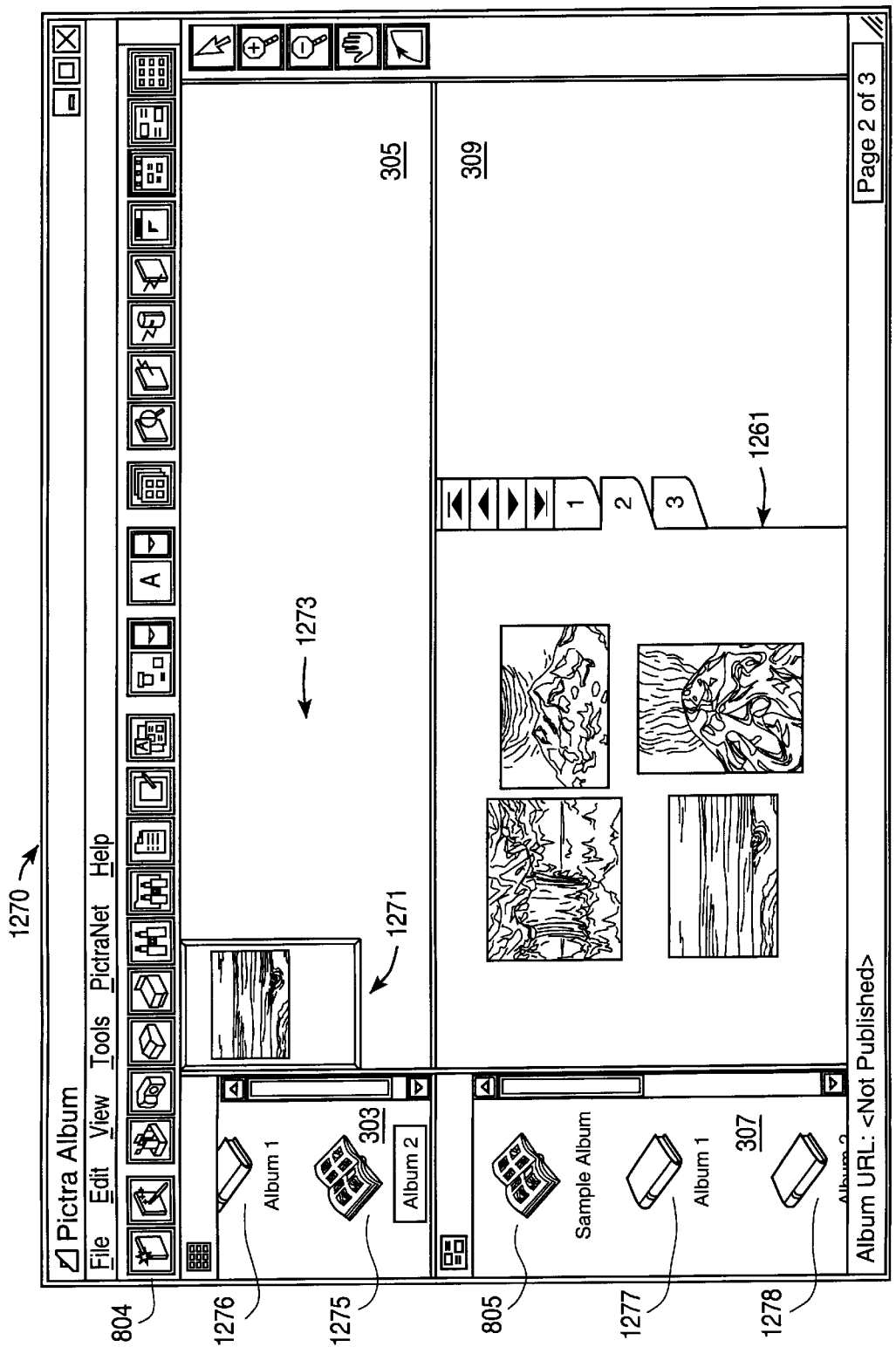
FIG. 13 is a graphical user interface which depicts certain aspects of the present invention.

FIG. 12E shows another view of an album authoring software according to one embodiment of the present invention. The window 1250 includes the picture database region 303, the thumbnail region 305, the album list region 307 and the album page region 309 for the selected album. The picture database region 303 includes the opened shoebox icon 803 and the closed sample album icon 1242. Since the shoebox icon has been opened, all thumbnails in the picture database are displayed in the thumbnail region 305. Thus the thumbnails 1251 are shown in this region 305. Since the second page of the selected album, which is the Sample Album, is selected, this second page is shown in the album page region 309. The second page 1253 of the Sample Album has two available picture slots 1253a and 1253b. The user may, while simultaneously viewing the thumbnails in the thumbnail region 305, select and drag a selected thumbnail to one of the two picture slots to place the image represented by the thumbnail at this spot in the picture album.

Also as noted above, the user may change the order of the pictures in the selected album shown in the album page region 309. One way to change this order may be performed by selecting the same album in both the picture database region 303 and the album list region 307. This is shown in FIG. 12F. In particular, FIG. 12F shows that the sample album has been selected in both the picture database region 303 (as indicated by the opened sample album icon 1242a in the picture database region) and by the opened sample album icon 805 in the album list region 307. Thus all the thumbnails 1265 for the selected album are shown in the thumbnail region 305 and a particular page in the selected album, in this case page 1261, is shown in the album page region 309. The user may modify the order in the selected album by selecting a particular thumbnail in the thumbnail region and dragging and dropping the thumbnail to a new position in the thumbnail region thereby automatically and dynamically changing the order of the pictures in the album page which is displayed below the thumbnail region.

FIG. 13 shows an example of multiple albums being shown in both the picture database region 303 and the album list region 307. Album 2, represented by the icon 1275 which is shown as opened, has been selected in the picture database region 303 resulting in the thumbnail 1271 being displayed. There is only one image in album 2 and thus only one thumbnail is shown in the thumbnail region 305 (alternatively labeled region 1273). A different album has been selected in the album list region 307. This album is the sample album which is shown as opened sample album 805, and a page from that selected album, page 1261, is shown in the album page region 309. If the user desires, the image from album 2 may be added to the sample album by dragging the thumbnail 1271 to a page in the selected album in the album page region 309.

Figure 14:
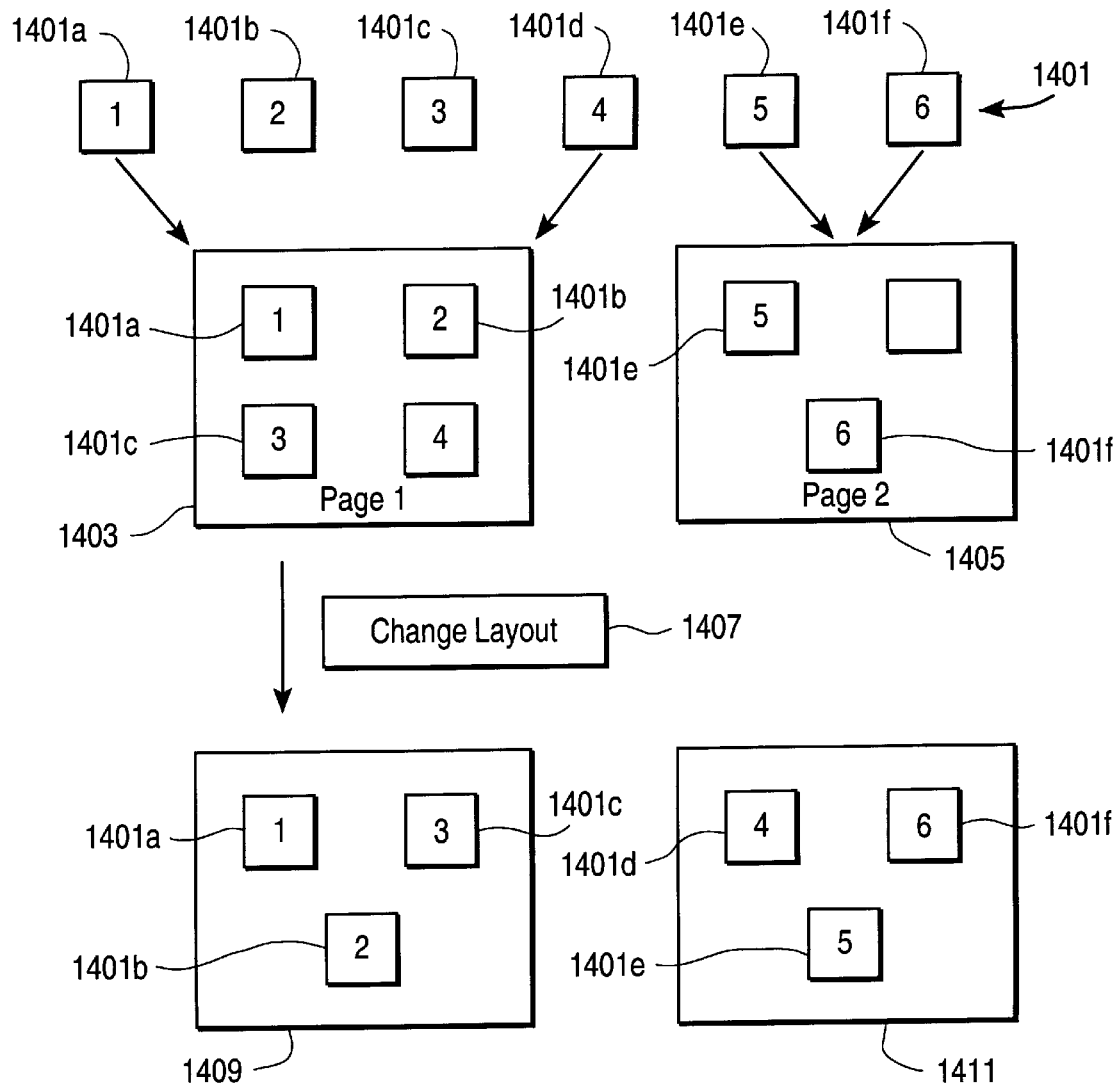
FIG. 14 illustrates a method according to the present invention in which a picture album is dynamically regenerated after changing the layout of the album.

FIG. 14 shows one aspect of the present invention which involves a dynamic changing of album pages as a result of the changing of the layout of a page. A row of thumbnails 1401 includes six thumbnail images 1401a, 1401b, 1401c, 1401d, 1401e, and 1401f. The currently selected layout for the two pages of the album, pages 1403 and 1405, are also shown in FIG. 14. Album page 1403 has a four-picture layout, and album page 1405 has a three-picture layout. Each of the slots in the two different pages has an assigned number and the ordered list of pictures represented by the row of thumbnails is assigned accordingly as shown in FIG. 14. When the user changes the layout such as a change layout operation 1407, the picture album automatically and dynamically repositions the pictures. Thus if the user selects a three-picture layout for the first page of the picture album, then album page 1409 is created for the first page and the ordered list of pictures is reassigned to the new slot numbers in the album pages 1409 and 1411.

Figure 15:
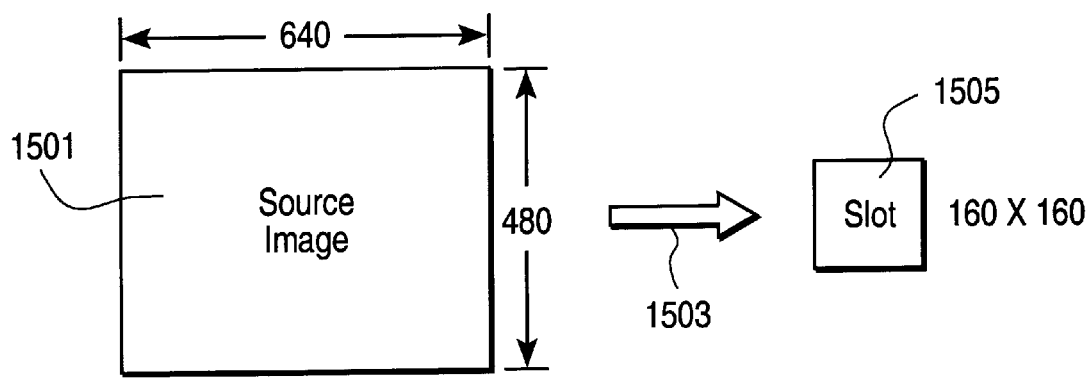
FIG. 15 depicts a method according to the present invention in which a source image is presented on an album page according to one aspect of the present invention.

Another aspect of the present invention is shown in FIG. 15. Whenever an image in one embodiment is placed into a picture slot on an album page, it is scaled using conventional scaling techniques to fit into the slot while at the same time maintaining the aspect ratio of the original image. As shown in FIG. 15, the original image 1501 has a width of 640 pixels and a height of 480 pixels. When this source image is placed into a particular album page slot, such as slot 1505, the source image will be scaled to a width of 160 pixels by a height of 120 pixels in order to keep the same aspect ratio of the source image. Thus the slot, shown as 160 pixels by 160 pixels will in one direction not be completely filled up.

The foregoing description has provided numerous examples of the present invention. It will be appreciated that various modifications and changes may be made thereto without departing from the broader spirit and scope of the invention as set forth in the appended claims. Further details concerning particular embodiments of the present invention may also be found in the following copending patent application Ser. No. 08/957,219, which was filed Oct. 24, 1997, and which is hereby incorporated herein by reference; this copending application is as follows: "Methods and Apparatuses for Transferring Data Between Data Processing Systems" by inventors Chan Chiu, Steve Morris, and Wu Wang.

What is claimed is:

1. A method in a digital processing system for creating a collection of digital media, said method comprising:

defining search parameters;

searching, using said search parameters, through parameters for a first plurality of digital media to obtain a second plurality of digital media which is a subset of said first plurality of digital media;

selecting a format for a media container for said second plurality of digital media;

generating automatically said media container for said second plurality of digital media, wherein said media container further includes information concerning said selected format, said media container being transferable as an entity between computer systems.

2. A method as in claim 1 wherein a database stores information specifying each of said digital media in said second plurality of digital media and stores information concerning said media container.

3. A method as in claim 2 wherein said searching step comprises searching said database which comprises information concerning each digital media of said first plurality of digital media.

4. A method as in claim 1 wherein said format is selected from a list of pre-defined layouts.

5. A method as in claim 1 wherein said media container is a picture album which displays an image for each of said second plurality of digital media.

6. A method as in claim 1 wherein said searching step comprises displaying a representation of each digital media found in said search through parameters and requesting a user to select certain of said representations to obtain said second plurality of digital media.

7. A method as in claim 1 wherein said first plurality of digital media are in a first media container and said media container is created from searching for digital media in only said first media container.

8. A method as in claim 1 wherein a database stores information concerning digital media which is capable of not being in any media container and wherein, each digital media of said first plurality of digital media is represented in said database.

9. A computer readable storage medium containing executable computer program instructions which when executed by a digital processing system cause the digital processing system to perform a method comprising:

defining at least one search parameter;

searching, using said search parameter, through parameters for a first plurality of digital media to obtain a second plurality of digital media which is a subset of said first plurality of digital media;

selecting a format for a media container for said second plurality of digital media;

generating automatically said media container for said second plurality of digital media, wherein said media container further includes information concerning said selected format, said media container being transferable as an entity between computer systems.

10. A computer readable storage medium as in claim 9 wherein a database stores information specifying each of said digital media in said second plurality of digital media and stores information concerning said media container.

11. A computer readable storage medium as in claim 10 wherein said searching step comprises searching said database which comprises information concerning each digital media of said first plurality of digital media.

12. A computer readable storage medium as in claim 9 wherein said format is selected from a list of pre-defined layouts.

13. A computer readable storage medium as in claim 9 wherein said media container is a picture album which displays an image for each of said second plurality of digital media.

14. A computer readable storage medium as in claim 9 wherein said searching step comprises displaying a representation of each digital media found in said search through parameters and requesting a user to select certain of said representations to obtain said second plurality of digital media.

15. A computer readable storage medium as in claim 9 wherein said first plurality of digital media are in a first media container and said media container is created from searching for digital media in only said first media container.

16. A computer readable storage medium as in claim 9 wherein a database stores information concerning digital media which is capable of not being in any media container and wherein, each digital media of said first plurality of digital media is represented in said database.

* * * * *